United States Patent
Kufel et al.

(10) Patent No.: US 12,506,185 B2
(45) Date of Patent: Dec. 23, 2025

(54) BATTERY CELL MONITORING SYSTEM, A METHOD OF OPERATING A BATTERY CELL MONITORING SYSTEM, AND A NON-TRANSITORY COMPUTER READABLE MEDIUM TO STORE COMPUTER-READABLE CODE FOR FABRICATION OF A BATTERY CELL MONITORING SYSTEM

(71) Applicant: Arm Limited, Cambridge (GB)

(72) Inventors: Jedrzej Kufel, Soham (GB); Emre Ozer, Buckden (GB); John Philip Biggs, Cambridge (GB); James Edward Myers, Great Wilbraham (GB); Remy Pottier, Grenoble (FR)

(73) Assignee: Arm Limited, Cambridge (GB)

( * ) Notice: Subject to any disclaimer, the term of this patent is extended or adjusted under 35 U.S.C. 154(b) by 1004 days.

(21) Appl. No.: 17/584,680

(22) Filed: Jan. 26, 2022

(65) Prior Publication Data
US 2023/0238589 A1    Jul. 27, 2023

(51) Int. Cl.
H01M 10/42   (2006.01)
H02J 7/00    (2006.01)
G08C 17/02   (2006.01)

(52) U.S. Cl.
CPC ..... *H01M 10/4257* (2013.01); *H02J 7/00032* (2020.01); *H02J 7/0047* (2013.01);
(Continued)

(58) Field of Classification Search
CPC ..... H01M 10/4257; H01M 2010/4271; H01M 2010/4278; H01M 10/425; H01M 10/46;
(Continued)

(56) References Cited

U.S. PATENT DOCUMENTS

2010/0134305 A1* 6/2010 Lu ............ H02J 7/342
                                              320/135
2011/0258471 A1* 10/2011 Daniel ........ H04Q 9/00
                                              713/340
(Continued)

FOREIGN PATENT DOCUMENTS

WO   WO-2019122064 A1 *  6/2019 ........... B60L 58/10

OTHER PUBLICATIONS

Texas Instruments (TI) article, "TI revolutionizes EV battery management with the industry's best-performing wireless BMS solution, the first concept assessed for enabling ASIL D systems", Jan. 7, 2021, 5 pp., at URL: https://news.ti/com/ti-revolutionizes-ev-battery-management-with-industrys-best-performing-wireless-bms-solution-first-concept-assessed-for-enabling-asil-d-systems.
(Continued)

*Primary Examiner* — Adnan Aziz
(74) *Attorney, Agent, or Firm* — NIXON & VANDERHYE P.C.

(57) ABSTRACT

There is provided a battery cell monitoring system comprising a flexible substrate able to conform to a surface of a battery cell to be monitored and wireless communication circuitry to be positioned proximate to a surface of the battery cell and arranged to communicate with one or more other battery cell monitoring systems. The battery cell monitoring system is provided with control circuitry integrated onto the flexible substrate to control the wireless communication circuitry to perform two types of communication. The first of the two types of communication is a local communication between the battery cell monitoring system and each of the one or more other battery cell monitoring systems. The second of the two types of communication is a non-local communication between the battery cell monitoring system and a battery management
(Continued)

system routed via inter-cell communication with the one or more other battery cell monitoring systems.

20 Claims, 14 Drawing Sheets

(52) U.S. Cl.
CPC ..... *G08C 17/02* (2013.01); *H01M 2010/4271* (2013.01); *H01M 2010/4278* (2013.01)

(58) Field of Classification Search
CPC .. H01M 10/48; H01M 10/482; H01M 10/486; H02J 7/00032; H02J 7/0013; H02J 7/0047; G08C 17/02; G01R 31/396; Y02E 60/10
See application file for complete search history.

(56) References Cited

U.S. PATENT DOCUMENTS

| | | | |
|---|---|---|---|
| 2012/0038520 A1* | 2/2012 | Cornwell | H01Q 9/0428 343/702 |
| 2013/0017421 A1* | 1/2013 | Onnerud | H01M 10/613 429/96 |
| 2013/0193925 A1 | 8/2013 | Abe et al. | |
| 2014/0214242 A1* | 7/2014 | Seo | B60L 58/20 701/2 |
| 2014/0347249 A1* | 11/2014 | Bourilkov | H01Q 1/20 343/904 |
| 2014/0361688 A1* | 12/2014 | Recker | H05B 47/19 315/86 |
| 2017/0018820 A1* | 1/2017 | Fukuda | G01R 31/382 |
| 2018/0109328 A1* | 4/2018 | Eberhard | H04B 10/806 |
| 2018/0198177 A1* | 7/2018 | Chen | H01M 10/425 |
| 2019/0131802 A1 | 5/2019 | Robbins | |
| 2019/0242949 A1* | 8/2019 | Lemkin | H01M 10/42 |
| 2019/0339334 A1* | 11/2019 | Mikolajczak | G01R 31/392 |
| 2020/0266405 A1* | 8/2020 | Pokora | H01M 10/486 |
| 2021/0057784 A1* | 2/2021 | Dhanani | G01N 21/7703 |
| 2021/0266075 A1* | 8/2021 | Rigelsford | H04B 10/114 |
| 2021/0328675 A1 | 10/2021 | Hofer et al. | |
| 2022/0037902 A1* | 2/2022 | Forssell | H02J 7/0013 |
| 2022/0303906 A1* | 9/2022 | Khan | H04W 52/0277 |
| 2023/0032112 A1* | 2/2023 | Pokora | G01B 7/18 |

OTHER PUBLICATIONS

Alex Milne, "The Myth of Half-wave Diversity Antenna Placement", in blog RF Venue, downloaded/printed on Jan. 18, 2022, 4 pp., at URL: https://www.rfvenue.com/blog/2014/12/15/the-myth-of-half-wave-diversity-antenna-placement.
Taylor Vogt, Applications Engineer, Battery Management Systems, Texas Instruments, Wired vs. Wireless Communications in EV Battery Management, Oct. 20, 2020, 6 pp., at URL: www.ti.com.
Texas Instruments data sheet, "BQ79616-Q1, BQ79614-Q1, BQ79612-Q1 Functional Safety-Compliant Automotive 16S/14S/12S Battery Monitor, Balancer and Integrated Hardware Protector", dated Jul. 2, 2021, 13 pp., at URL: www.ti.com.
Combined Search and Examination Report for GB Application No. 2300215.7 dated Jun. 19, 2023, 5 pages.

\* cited by examiner

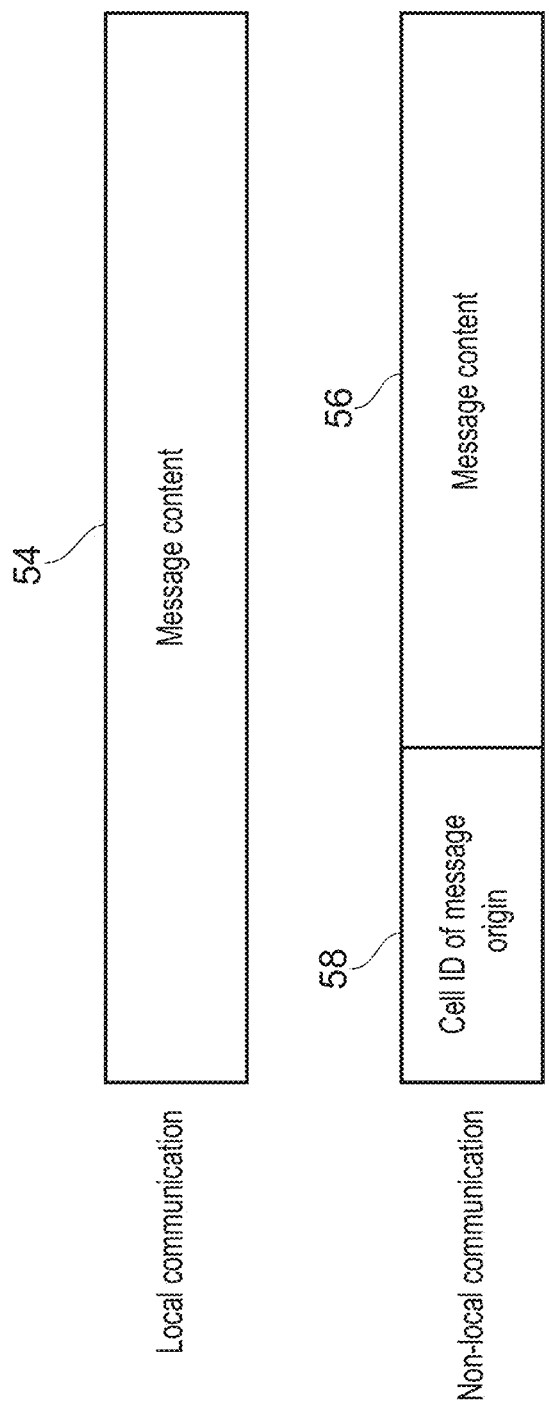

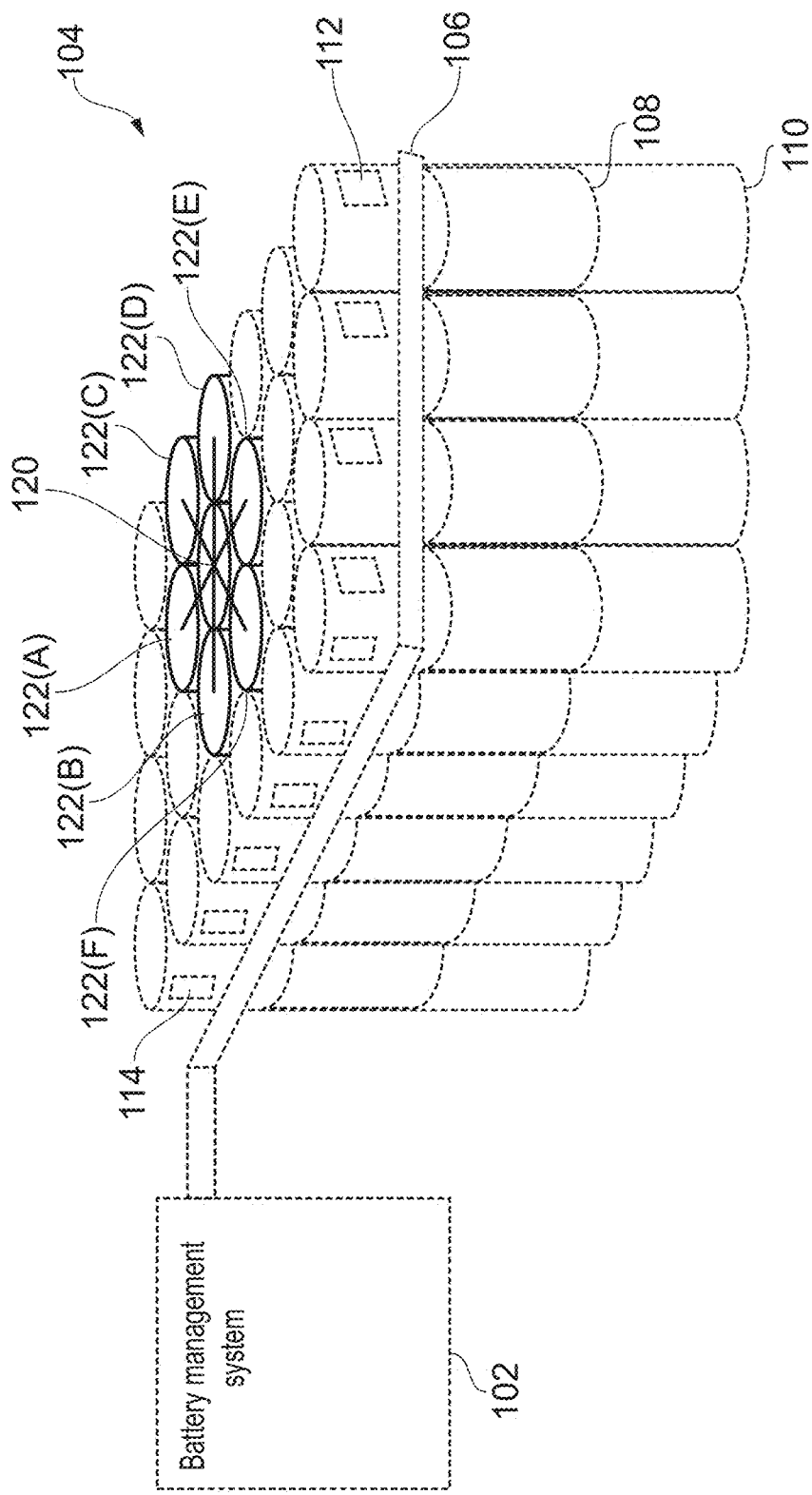

BATTERY CELL MONITORING SYSTEM, A METHOD OF OPERATING A BATTERY CELL MONITORING SYSTEM, AND A NON-TRANSITORY COMPUTER READABLE MEDIUM TO STORE COMPUTER-READABLE CODE FOR FABRICATION OF A BATTERY CELL MONITORING SYSTEM

TECHNICAL FIELD

The present invention relates to data processing. More particularly the present invention relates to a battery cell monitoring system, a method of operating a battery cell monitoring system, and a non-transitory computer readable medium to store computer-readable code for fabrication of a battery cell monitoring system.

BACKGROUND

An electric battery, for example a rechargeable electric battery, may be used as an energy storage medium in a wide range of applications, such as in the case of an electric vehicle battery (EVB), where the electric vehicle may take a wide variety of forms, such as cars, scooters, bikes, as well as other industrial or consumer devices. An electric battery usually consists of several battery cells organised into a battery module, and several battery modules organised into a battery pack. The battery pack may be provided with electronic circuitry supporting a battery management system. Such battery packs may be vulnerable to disruptive or even dangerous events such as thermal runaway (a rapid temperature rise) in one or more of its cells, for example due to a short circuit occurring due to physical shock or overcharging.

SUMMARY

In a first example configuration there is provided a battery cell monitoring system comprising:
  a flexible substrate able to conform to a surface of a battery cell to be monitored;
  wireless communication circuitry to be positioned proximate to a surface of the battery cell and arranged to communicate with one or more other battery cell monitoring systems;
  control circuitry integrated onto the flexible substrate, wherein the control circuitry is configured to control the wireless communication circuitry to perform two types of communication comprising:
    a local communication between the battery cell monitoring system and each of the one or more other battery cell monitoring systems; and
    a non-local communication between the battery cell monitoring system and a battery management system, wherein the non-local communication is routed via inter-cell communication with the one or more other battery cell monitoring systems,
  wherein the control circuitry is configured to cause information to be incorporated into communication signals issued by the wireless communication circuitry sufficient to distinguish between the local communication and the non-local communication.

In a second example configuration there is provided a battery pack comprising:
  a plurality of battery modules, wherein each battery module comprises a plurality of battery cells and wherein two or more of the plurality of battery cells comprise a battery cell monitoring system in accordance with the above-mentioned first example configuration; and
  a battery management system comprising communication circuitry configured to receive each non-local communication transmitted by the wireless communication circuitry of the battery cell monitoring system.

In another example configuration there is provided a method of operating a battery cell monitoring system comprising a flexible substrate able to conform to a surface of a battery cell to be monitored and wireless communication circuitry to be positioned proximate to a surface of a battery cell and arranged to communicate with one or more other battery cell monitoring systems, the method comprising:
  controlling the wireless communication circuitry, using control circuitry integrated onto the flexible substrate, to perform a local communication between the battery cell monitoring system and each of the one or more other battery cell monitoring systems;
  controlling the wireless communication circuitry, using the control circuitry, to perform a non-local communication between the battery cell monitoring system and a battery management system, wherein the non-local communication is routed via inter-cell communication with the one or more other battery cell monitoring systems; and
  incorporating information into communication signals issued by the wireless communication circuitry sufficient to distinguish between the local communication and the non-local communication.

In a still further example configuration there is provided a non-transitory computer-readable medium to store computer-readable code for fabrication of a battery cell monitoring system comprising:
  a flexible substrate able to conform to a surface of a battery cell to be monitored;
  wireless communication circuitry to be positioned proximate to a surface of the battery cell and arranged to communicate with one or more other battery cell monitoring systems;
  control circuitry integrated onto the flexible substrate, wherein the control circuitry is configured to control the wireless communication circuitry to perform two types of communication comprising:
    a local communication between the battery cell monitoring system and each of the one or more other battery cell monitoring systems; and
    a non-local communication between the battery cell monitoring system and a battery management system, wherein the non-local communication is routed via inter-cell communication with the one or more other battery cell monitoring systems,
  wherein the control circuitry is configured to cause information to be incorporated into communication signals issued by the wireless communication circuitry sufficient to distinguish between the local communication and the non-local communication.

BRIEF DESCRIPTION OF THE DRAWINGS

The present invention will be described further, by way of example only, with reference to configurations thereof as illustrated in the accompanying drawings, in which:

FIG. 3 schematically illustrates a format of a local communication and a non-local communication according to various configurations of the present techniques;

FIG. 7b schematically illustrates a battery management system and a plurality of battery cell monitoring systems according to various configurations of the present techniques;

DESCRIPTION OF EXAMPLE CONFIGURATIONS

Figure 1:
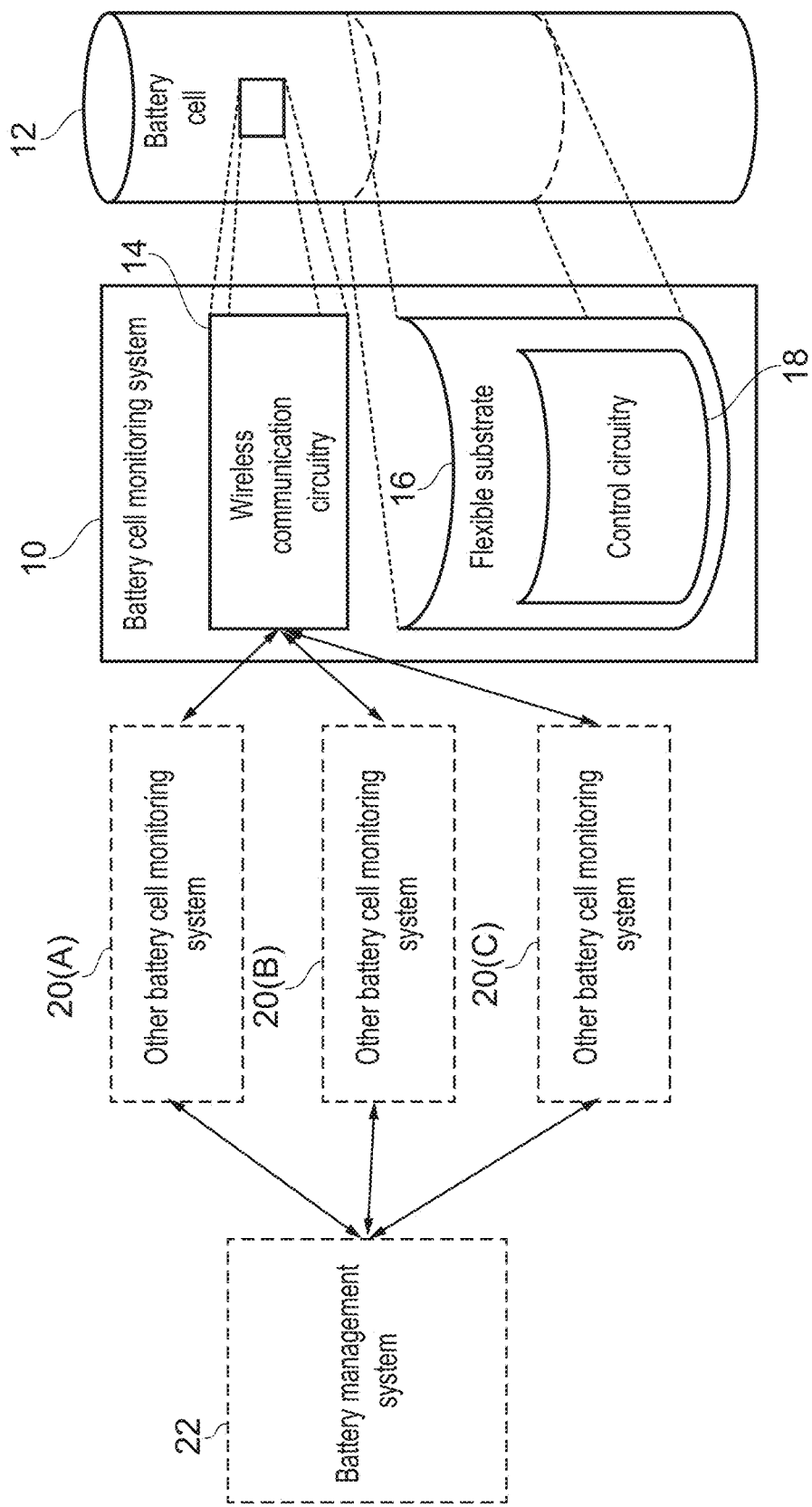
FIG. 1 schematically illustrates an apparatus incorporating battery cell monitoring systems according to various configurations of the present techniques.

Before discussing the configurations with reference to the accompanying figures, the following description of configurations is provided.

In accordance with one example configuration there is provided a battery cell monitoring system comprising a flexible substrate able to conform to a surface of a battery cell to be monitored. The battery cell monitoring system further comprises wireless communication circuitry to be positioned proximate to a surface of the battery cell and arranged to communicate with one or more other battery cell monitoring systems. The battery cell monitoring system is provided with control circuitry integrated onto the flexible substrate. The control circuitry is configured to control the wireless communication circuitry to perform two types of communication. The first of the two types of communication is a local communication between the battery cell monitoring system and each of the one or more other battery cell monitoring systems. The second of the two types of communication is a non-local communication between the battery cell monitoring system and a battery management system. In the second of the two types of communication, the non-local communication is routed via inter-cell communication with the one or more other battery cell monitoring systems. The control circuitry is configured to cause information to be incorporated into communication signals issued by the wireless communication circuitry sufficient to distinguish between the local communication and the non-local communication.

The battery cell monitoring system is provided to facilitate communication between the battery cell monitoring system and the one or more other battery cell monitoring systems, and between the battery cell monitoring system and a battery management system. Whilst wired communication can be achieved through the provision of additional cabling between each battery cell in a battery pack and a corresponding battery management system, the additional cabling results in an increased component overhead resulting in additional weight and cost, a larger overall footprint, the requirement for additional components in order to provide isolation and increased maintenance requirements. In addition, traditional wireless communication between the battery cell monitoring systems and the battery management system may not always be practical due to the topological constraints associated with packing battery cells into a battery pack. The inventors have realised that these problems can be overcome through the provision of a battery cell monitoring system that provides two different types of communication each of which is facilitated through communication between the battery cell monitoring system and one or more other battery cell monitoring systems. The battery cell monitoring system can perform a local communication in which it communicates with other battery cell monitoring systems and can perform a non-local communication in which it communicates with the battery management system. The non-local communication with the battery management system is routed from the battery cell monitoring system to the one or more battery management systems via one or more of the other battery cell monitoring systems. Hence, the battery monitoring system need only be provided with communication circuitry that is arranged to communicate with other battery cell monitoring systems, for example, nearby battery cell monitoring systems. Routing the communication between the battery cell monitoring system and the battery management system can then be achieved by passing the message along through a sequence of other battery cell monitoring systems until the message reaches the battery management system or a communication port to facilitate the further transfer of communications to the battery management system.

The use of the flexible substrate to house the control circuitry is beneficial because, by using a suitable technique, such as printing, to integrate the control circuitry onto a flexible substrate, the control circuitry can be provided on a medium that is able to conform to a surface of the battery cell. In other words, the flexible substrate can bend (flex) in order to ensure that the circuitry closely adheres to a surface even in a case where the surface is non-planar. Such a flexible substrate can be applied to an external surface of battery cells independent of shape of the particular battery cells. For example, the flexible substrate could be readily applied to cylindrical battery cells and/or prismatic battery cells during or subsequent to the manufacturing of the individual battery cells. This approach reduces construction overheads and minimises any changes that are needed to existing battery cell design.

If desired, the wireless communication circuitry can be provided separate to the flexible substrate, and coupled to the control circuitry provided on the flexible substrate. However, in one example implementation, the wireless communication circuitry is integrated into the flexible substrate in addition to the control circuitry. Provision of the wireless communication circuitry as part of the flexible substrate results in an efficient implementation that can be fabricated as a single flexible battery cell monitoring system. The flexible substrate can then be easily attached to battery cells even when the battery cells have cylindrical or otherwise curved surfaces.

In order to distinguish between whether a communication is a local communication or a non-local communication, the control circuitry of the battery cell monitoring system is configured to incorporate information into the communication signals that are issued by the wireless communication circuitry. The information incorporated into the communication signals can be generally defined and need only be sufficient to distinguish the type of communication as a local communication or a non-local communication. This information can be incorporated into the signals by any suitable means. In some configurations, the information is incorporated as one or more bits of information transmitted by the communication circuitry. In other configurations, the information is incorporated through the timing of the transmission by the communication circuitry.

In some configurations the control circuitry is configured to incorporate an identifier into the communication signals forming the non-local communication and to omit the identifier from the communication signals forming the local communication, to thereby distinguish between the local communication and the non-local communication. Local communications can therefore be distinguished as those that have no identifier whilst non-local communications are those for which the identifier is present. Hence, the one of the other battery cell monitoring systems can determine, on receipt of a communication in which no identifier is provided, that the communication is a local communication and does not need to be routed to the battery management system via the one or more other battery cell monitoring systems. In contrast, the one or more other battery cell monitoring systems can determine, on receipt of a communication in which an identifier is provided, that the communication is a non-local communication which is intended for the battery management system. Hence, the one or more other battery cell monitoring systems can route the non-local communication towards the battery management system via inter-cell communication with further battery cell monitoring systems of the one or more other battery cell monitoring systems.

The identifier can be one or more bits that are used to indicate a type of the communication. However, in some configurations the identifier is used to contain additional information that may be of relevance to the battery management system and that would not be required in a local communication. In some configurations the identifier is a cell address of the battery cell indicating that the non-local communication originated from the battery cell monitoring system. In such configurations each of the one or more other battery cell monitoring systems that receive the non-local communication are able to determine the battery cell monitoring system (and, hence, the corresponding battery cell) from which the non-local communication originated. This information is passed onto the further battery cell monitoring systems of the one or more other battery cell monitoring systems as part of the routing of the non-local communication to the battery management system. In some configurations, each of the one or more other battery cell monitoring systems is arranged to determine a shortest route to the battery management system based on the identifier and internal knowledge of that batteries cell monitoring system's address. In other configurations, each of the one or more other battery cell monitoring systems passes the non-local communication on to all adjacent battery cell monitoring systems, thereby ensuring that the non-local communication is propagated by all possible routes.

In addition to performing the local and non-local communication with the one or more other battery cell monitoring systems, in some configurations the wireless communication circuitry is arranged to receive a transmitted communication from a transmitting battery cell monitoring system of the one or more other battery cell monitoring systems. Each of the battery cell monitoring systems are therefore able to both initiate communications to the one or more other battery cell monitoring systems and to receive communications from the one or more other battery cell monitoring systems. In particular, the communications that the battery cell monitoring system is configured to receive from the one or more other battery cell monitoring systems comprise both local and non-local communications.

In some configurations the control circuitry is arranged to perform a determination as to whether the transmitted communication is a local transmitted communication requiring a response from the battery cell monitoring system or a non-local transmitted communication intended for the battery management system based on a transmitted identifier encoded in the transmitted communication. Each battery cell monitoring system is therefore able to pass information locally, for example, in relation to a local state of the battery cell, and each battery cell monitoring system is also able to pass information that is routed to the battery management system to enable the battery management system to make decisions relating to a state of the battery cell associated with the battery cell monitoring system and one or more other battery cells associated with the one or more other battery cell monitoring systems based on a global picture of the state of battery cells as reported by each of the battery cell monitoring systems.

In some configurations the transmitted identifier is a cell address indicating that the transmitted communication originated from a given battery cell monitoring system amongst the one or more other battery cell monitoring systems, the control circuitry is responsive to inclusion of the transmitted identifier to determine that the transmitted communication is the non-local transmitted communication, and the control circuitry is responsive to an absence of the transmitted identifier to determine that the transmitted communication is the local transmitted communication. In some configurations the cell address corresponds to a position within an array of battery cells. For example, the cell address could indicate a row and a column within a square array of battery cells or could indicate an unique number identifying the particular position of the battery cell monitoring system (and the associated battery cell) within an array. In other configurations, the cell address also includes an array identifier indicating an array of a plurality of arrays in which the battery cell monitoring system is located.

The response of the control circuitry to the receipt of the transmitted communication depends on a type of the communication. In some configurations the control circuitry is arranged, in response to the determination indicating that the transmitted communication is a local transmitted communication, to generate response status information and to control the wireless communication circuitry to transmit the response status information as a local response communication. The response status information can relate to any aspect of the battery cell that is monitored by the battery cell monitoring system. In some configurations the response status information comprises at least one of information relating to a charge state of the battery cell, information relating to a pressure exerted on the battery cell, information relating to a deformation of the battery cell, and information relating to a temperature of the battery cell. In this way, the local communication provides the means for the battery cell monitoring system to provide information relating to the battery cell to the given battery cell monitoring system. Hence, each of the battery cell monitoring system and the one or more other battery cell monitoring systems is able to build up a picture of a local status of battery cells with which that battery cell monitoring system is in local communication with.

In some configurations the control circuitry is arranged, in response to the determination indicating that the transmitted communication is a non-local transmitted communication, to control the wireless communication circuitry to re-transmit the non-local transmitted communication to the battery management system via inter-cell communication with at least one of the other battery cell management systems. In some configurations, the re-transmission of the non-local transmitted communication is directed towards a particular one or more of the other battery cell management systems. In such configurations the control circuitry uses the cell address of the given battery cell monitoring system that is received as the transmitted identifier and the known address of the battery cell monitoring system to determine a route for the re-transmitted communication to the battery management system. Directional communication requires less power as the number of transmissions and re-transmissions by the battery cell monitoring systems in order to reach the battery management systems are lower. In other configurations, the re-transmission of the non-local transmitted communication is an omni-directional transmission (i.e., a transmission that is not directed). In this way, the non-local transmitted communication is routed to the battery management system by all possible routes at once. The battery management system can then ignore any duplicated communications that it receives. Such configurations offer a greater robustness to broken communication links.

The local communications can be used to perform any communications between the battery cell management system and the one or more other battery cell management systems. In some configurations the battery cell management system further comprises at least one sensor configured to output a signal indicative of a physical state of the battery cell, wherein the control circuitry is configured to generate status information based on the signal. The control circuitry is then configured to transmit the local communication to each of the one or more other battery cell monitoring systems in response to the status information meeting a given condition. The at least one sensor is therefore used to measure a physical state of the battery or the environment in which the battery is located. The battery cell monitoring system can therefore monitor (continuously or periodically) the battery cell and the environment around the battery cell to determine if conditions are anomalous. When the signal, that is output by the at least one sensor, indicates that the local environment is anomalous in one or more particular ways, i.e., the status information generated from the signal indicates that a given condition is met (satisfied), the battery cell monitoring system is configured to seek further information through a local communication to each of the one or more other battery cell monitoring systems. It should be noted that not all anomalous conditions require the initiation of local communication to gather status information from the battery cell monitoring systems of adjacent cells.

In some configurations the control circuitry is further responsive to the status information meeting a further given condition to report the status to the battery management system through a non-local communication that is routed through the one or more other battery cell monitoring systems.

The at least one sensor can take any form. In some configurations the at least one sensor is a gas emission sensor, the given condition is a threshold concentration of gas, and the local communication is a request for information indicative of gas emissions detected by at least one of the one or more other battery cell monitoring systems. The battery cell management system is responsive to detection of an anomalous gas concentration to seek to determine whether this information is unique to the gas emission sensor or whether there is any indication of gas emission detected by the one or more other battery cell monitoring systems. In this way, the battery cell monitoring system is able to build up a picture of the extent of the gas emission and can estimate which battery cell is likely to have caused the gas emission. In some configurations, the battery cell monitoring system is responsive to receiving the requested information indicative of gas emissions detected by the at least one of the one or more other battery cell monitoring systems to, when the received information meets a further condition, transmit a non-local communication to the battery management system indicative of the gas emission.

In some configurations the at least one sensor is a physical deformation sensor, the given condition is a threshold deformation, and the local communication is a request for information indicative of physical deformations detected by at least one of the one or more other battery cell monitoring systems. The physical deformation sensor can be provided in addition to or as an alternative to the gas emission sensor. The battery cell management system is therefore responsive to detection of an anomalous physical deformation to determine whether this information is unique to the physical deformation sensor or whether there is any indication of physical deformation detected by the one or more other battery cell monitoring systems. In this way, the battery cell monitoring system is able to build up a picture of the extent of the physical deformation and can estimate which battery cell is likely to be responsible for the deformation. For example, damage to a battery cell may result in swelling of that battery cell. For tightly packed battery cells, the swelling of one battery cell could result in a compression of adjacent battery cells. Hence, by determining which battery cells are detected to have deformations, the damaged battery cell address can be estimated. In some configurations, the battery cell monitoring system is responsive to receiving the requested information indicative of physical deformations detected by the at least one of the one or more other battery cell monitoring systems to, when the received information meets a further condition, transmit a non-local communication to the battery management system indicative of the physical deformation.

The given condition can be any condition. In some configurations the given condition is a fixed threshold condition. In other configurations the given condition relates to a rate of variability of the signal provided by the at least one sensor. Alternatively, the given condition can relate to a combination of signals from a plurality of sensors that are provided as part of the battery cell monitoring system. In some configurations the given condition is a dynamically varying threshold condition. The dynamically varying threshold condition can be based, for example, on a mean and variance of the signal(s) detected from the at least one sensor and/or can be based on means and variances of signals detected from the one or more other battery cell monitoring systems received as local communications. Alternatively, or in addition, the dynamically varying threshold condition can be set by the battery management system communicating via non-local communications. In some configurations the dynamically varying threshold condition is set based on a machine learning algorithm that takes the signal levels from all battery cell monitoring systems that are associated with the battery management system into account. The machine learning algorithm can consist of any algorithm trained to recognise anomalous battery cell behaviour based on local signals associated with the battery cell monitoring system and non-local information received from the battery management system.

The wireless communication circuitry can be any suitable form of wireless communication circuitry, including for example one using a near field communication channel approach, such as RFID/NFC. In some configurations the wireless communication circuitry is an optical communication interface. The optical communication interface can then communicate optically using the optical communication interface. In some configurations the optical communication interface uses different optical frequencies for local communications and non-local communications. In other configurations the optical communication interfaces uses a time division multiplexing approach to facilitate local and non-local communications.

The optical communication interface can be provided with any suitable light source and light sensor. In some configurations the light sensor is a photo resistor, a photodiode, or a phototransistor. In some configurations the optical communication interface comprises at least one LED-photodiode pair. The LED provides the means for the battery cell monitoring system to communicate (via local or non-local communication) with the one or more other battery cell monitoring systems and the photodiode provides the means for the battery cell monitoring system to receive communications (local and non-local) from the one or more other battery cell monitoring systems.

The quantity and arrangement of LED-photodiode pairs is not particularly limited. In some configurations the at least one LED-photodiode pair comprises a plurality of LED-photodiode pairs, each LED-photodiode pair to be positioned proximate to the surface of the battery cell and aligned to perform communication in a different direction to each other LED-photodiode pair of the plurality of LED-photodiode pairs. For a prismatic battery cell arranged to be packed into a square array of battery cells, the battery cell management system may for example be provided with four LED-photodiode pairs each arranged to communicate along one of the two axes of the array in one of the two possible directions. In such a configuration the battery cell monitoring system is able to communicate with battery cell monitoring systems that are immediately adjacent to the battery cell. For example, the battery cell monitoring system at position (i, j) of the square array is able to communicate with battery cell monitoring systems at positions (i−1, j), (i+1, j), (i, j−1), and (i, j+1). A local communication can therefore be transmitted from the battery cell monitoring system at position (i, j) to determine information relating to the battery cell monitoring systems at positions (i−1, j), (i+1, j), (i, j−1), and (i, j+1). In addition, a non-local communication from the battery cell monitoring system at position (i, j) would have to be routed to the battery management system through the battery cell monitoring systems at positions (i−1, j), (i+1, j), (i, j−1), and (i, j+1) which may each re-transmit the non-local communication to further battery cell monitoring systems.

In such configurations, for a cylindrical battery cell arranged to be packed into a hexagonal array of battery cells, the battery cell monitoring system may be provided with six LED-photodiode pairs each arranged to communicate along one of the three axes of the array in one of the two possible directions. The battery cell monitoring system is able to communicate with battery cell monitoring systems that are immediately adjacent to the battery cell. For example, the battery cell monitoring system at position (i, j, k) of the square array is able to communicate with battery cell monitoring systems at positions (i−1, j, k), (i+1, j, k), (i, j−1, k), (i, j+1, k), (i, j, k−1), and (i, j, k+1). A local communication might therefore be transmitted from the battery cell monitoring system at position (i, j, k) to determine information relating to the battery cell monitoring systems at positions (i−1, j, k), (i+1, j, k), (i, j−1, k), (i, j+1, k), (i, j, k−1), and (i, j, k+1). In addition, a non-local communication from the battery cell monitoring system at position (i, j, k) would have to be routed to the battery management system through the battery cell monitoring systems at positions (i−1, j, k), (i+1, j, k), (i, j−1, k), (i, j+1, k), (i, j, k−1), and (i, j, k+1) which may each re-transmit the non-local communication to further battery cell monitoring systems.

By providing plural discrete LED-photodiode pairs, the battery cell management system can determine in which direction the local and non-local communications are issued. For example, the battery cell management system may be provided with information identifying it as being at a particular position in a rectangular array of an array of a known size. In addition, the battery management system may be addressed at a particular location of the rectangular array, or may be accessible from any edge of the array. In each example the battery cell monitoring system is able to identify a shortest route by which a non-local communication can be transmitted to the battery management system and can transmit a non-local communication only in those directions.

In some configurations each of the at least one LED-photodiode pairs is a flexible LED-photodiode pair able to conform to a surface of a battery cell to be monitored. The at least one flexible LED-photodiode pair enables easy integration onto the battery cell particularly in a case where the battery cell has a curved surface.

In some configurations the at least one LED-photodiode pair is a single LED-photodiode pair wrapped around the surface of the battery cell to be monitored. Provision of a single LED-photodiode pair further simplifies the construction as only a single LED-photodiode pair needs to be fabricated. Communication between battery monitoring systems with a single wrapped LED-photodiode pair is simplified as an orientation of the battery cell is not required in order to manage communication. Communication in such systems can be managed using any communication protocol. In some configurations the battery cell monitoring systems pass any non-local communication along to all adjacent battery cell monitoring systems. The non-local communications may be marked with a time stamp to prevent the non-local communications being looped endlessly around the battery cell monitoring systems. In other configurations, a preferred route is determined for the non-local communications. Such a preferred route can be based on a cell address of the battery cell monitoring system at which the non-local communication originates and knowledge of an address of the battery management system in a cell array. In such configurations each of the battery cell monitoring systems passes the communication along only if it is on the preferred route. Alternatively, in other configurations, each battery cell monitoring system monitors the non-local communications to ensure that each non-local communication is re-transmitted only once.

The communication provided by the optical communication interface can be defined in various ways. In some configurations the control circuitry is configured to control the optical communication interface to perform communication by performing one or more blinks of an optical element of the optical communication interface, in accordance with a given blinking protocol. The given blinking protocol is an example of a serial optical communication in which information is transmitted as a sequence of blinks corresponding to logical ones (LED in one of the on/off state) and logical zeros (LED in the other of the on/off state). In alternative configurations, the intensity of the LED can be varied to provide an analogue communication line between battery monitoring systems.

In some configurations the control circuitry is configured to control the optical communication interface to perform local communication by performing the one or more blinks to request information from each of the one or more other battery cell monitoring systems, and the control circuitry is configured to determine a state associated with each of the one or more other battery cell monitoring systems based on a number of blinks received from the one or more other battery cell monitoring systems. The one or more blinks to request information can be defined to follow any format. For example, a single blink could be used to request information from each of the one or more other battery cell monitoring systems, for example, the single blink could be used to request each receiving battery cell monitoring system to respond if that battery cell monitoring system is in an anomalous state. The battery cell monitoring system could then monitor for a single blink within a predetermined time frame from each of the one or more other battery cell monitoring systems as an indication that the state of the one or more other battery cell monitoring systems is an anomalous state. As an alternative, the battery cell monitoring system could blink a particular sequence to indicate that a true/false response to a particular question is required and, in response, the battery cell monitoring system could determine the state of each of the one or more other battery cell monitoring systems based on the receipt of zero, one, or more blinks from that battery cell monitoring system. Other alternatives to the blinking protocol will be readily apparent to the person having ordinary skill in the art.

In general, the communication circuitry is configured to perform local and non-local communications with one or more other battery cell monitoring systems. The one or more other battery cell monitoring systems may be located at any position relative to the battery cell monitoring system. However, in some configurations the battery cell is configured to be arranged in a battery module with a plurality of adjacent battery cells, each comprising one of the one or more battery cell monitoring systems, and the wireless communication circuitry is configured to communicate with the one or more battery cell monitoring systems that are adjacent to the wireless communication circuitry. Through provision of battery cell monitoring systems that can perform local communications with battery cell monitoring systems that are adjacent and non-local communications via the adjacent battery cell monitoring systems, a dense packing of the battery module can be achieved whilst still enabling communication between each of the battery cell monitoring systems.

In some configurations the wireless communication circuitry is arranged as an omni-directional communication device. Such a communication device provides the ability for the battery cell monitoring system to communicate in all directions simultaneously. In some configurations the omni-directional communication device is restricted to communicating in all directions within a single plane. In other configurations the omni-directional communication device is configured to communicate in all directions and is not restricted to a single plane.

In addition to the local and non-local communications, in some configurations the control circuitry is configured to control the wireless communication circuitry to perform a further non-local communication between the battery cell monitoring system and the battery management system, wherein the further non-local communication is routed directly from the wireless communication circuitry to the battery management system via a communication path independent of the one or more other battery cell management systems. The further non-local communication type provides the means for the battery monitoring system to communicate directly to the battery management system, for example, if the battery cell monitoring system is placed at an edge of a battery module and is in direct communication with the battery management system. In some configurations, the further non-local communication comprises a further identifier to distinguish it from the other type of non-local communication. In other configurations the battery cell management system is configured to make no distinction between the non-local communication and the further non-local communication such that the further non-local communication is distinguished only in terms of the location of the battery cell monitoring system within a battery pack.

In some configurations there is provided a battery pack comprising: a plurality of battery modules, wherein each battery module comprises a plurality of battery cells and wherein two or more of the plurality of battery cells comprise the battery cell monitoring system as described in any of the above configurations. A battery management system is also provided in the battery pack, and comprises communication circuitry configured to receive each non-local communication transmitted by the wireless communication circuitry of the battery cell monitoring system. In addition to the local and non-local communication types that can be utilised by the battery cell monitoring systems, the battery management system is able to transmit signals to communicate with each of the battery cell monitoring systems. In particular, the battery management system is able to perform a non-local communication specifying a particular battery cell monitoring system address associated with a particular battery cell monitoring system of the battery cells that comprise the battery cell monitoring system. In some configurations the battery management system is also able to perform a general communication to all of the battery cell monitoring systems which is transmitted to the battery cell monitoring systems via inter-cell communication.

In some configurations the wireless communication circuitry is an optical communication interface, and each of the plurality of battery modules is arranged with an optical guide configured to couple the battery management system to the plurality of battery cells of that module. The optical guide can be variously configured. In some configurations the optical guide is arranged to communicate with a single battery cell monitoring system of the plurality of battery cell monitoring systems. In alternative configurations the optical guide is arranged to communicate, in parallel, with each of the battery cell monitoring systems that is provided at one or more of the edges of the battery module. In such configurations non-local communications need only be routed from the cell from which the non-local communication originates to the optical guide. In this way the communication network between the battery management system and the battery cell monitoring systems is arranged to have a number of redundant communication paths resulting in a more robust system.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. The code may comprise a myHDL representation which is subsequently compiled into a Verilog representation. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally, or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively, or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively, or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Particular configurations will now be described with reference to the figures.

FIG. 1 schematically illustrates a battery cell monitoring system 10 according to various configurations of the present techniques. The battery cell monitoring system 10 is provided with wireless communication circuitry 14 and a flexible substrate 16. Control circuitry 18 is integrated onto the flexible substrate. The battery cell monitoring system 10 is arranged so that it can be applied to a battery cell 12. In particular, the control circuitry 18 is fabricated onto the flexible substrate so that it can conform to the surface of the battery cell 12. In addition, the wireless communication circuitry 14 is arranged so that it can be placed proximate to (e.g., onto the surface of) the battery cell 12. In one particular example implementation, the wireless communication circuitry 14 is also integrated onto the flexible substrate using flexible components.

The battery cell monitoring system 10 is configured to be able to communicate with one or more other battery cell monitoring systems 20. In the illustrated configuration, battery cell monitoring system 10 is able to communicate, via a local communication, with other battery cell monitoring systems 20(A), 20(B), and 20(C). In addition, the battery cell monitoring system 10 is arranged to perform a non-local communication between the battery cell monitoring system 10 and a battery management system 22. The battery cell monitoring system 10 performs the non-local communication with the battery management system 22 by communicating via the other battery cell monitoring systems 20. In particular, the battery cell monitoring system 10 can perform the non-local communication by communicating with the battery management system 22 via the other battery cell monitoring system 20(A) and/or through the other battery cell monitoring system 20(B) and/or through the other battery cell monitoring system 20(C). The control circuitry 18 of the battery cell monitoring system 10 is arranged to incorporate information into communication signals issued by the wireless communication circuitry 14 that is sufficient to distinguish between local communications and non-local communications.

Figure 2A:
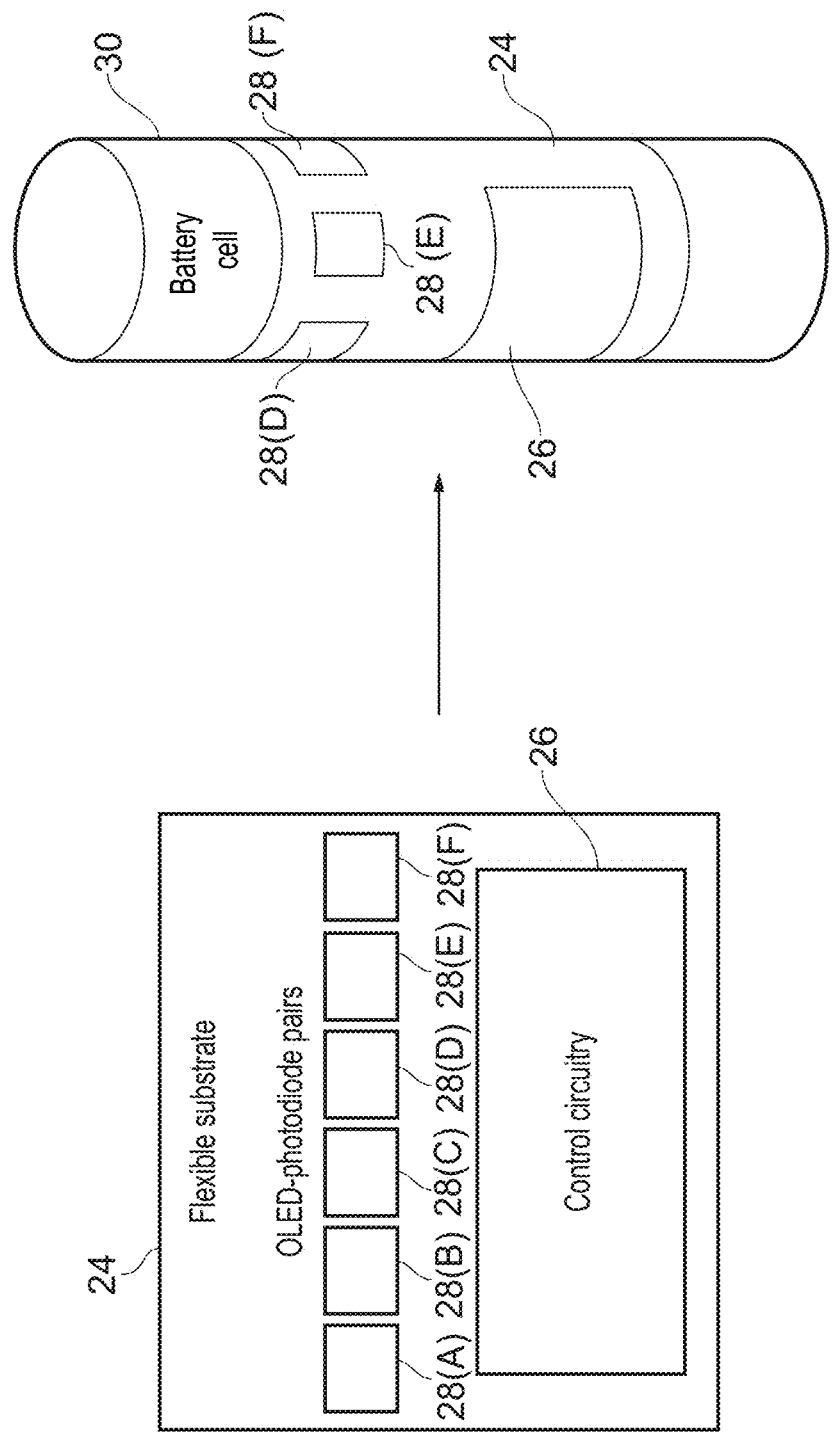
FIG. 2a schematically illustrates a battery cell monitoring system comprising a plurality of OLED-photodiode pairs integrated onto a flexible substrate according to various configurations of the present techniques.

FIG. 2a schematically illustrates a battery cell monitoring system in which the control circuitry 26 is integrated onto a flexible substrate 24. In addition, the flexible substrate 24 is provided with a plurality of flexible OLED-photodiode pairs 28 integrated thereon. In the illustrated example, the OLED-photodiode pairs 28 form at least part of the wireless communication circuitry with which the battery cell monitoring system 24 is able to communicate with the one or more other battery cell monitoring systems. Because the OLED-photodiode pairs 28 and the control circuitry 26 are integrated onto the flexible substrate 24, both the control circuitry 26 and the -OLED-photodiode pairs 28 can be applied to the surface of a battery cell 30. The right hand side of FIG. 2a schematically illustrates the flexible substrate 24 applied to the battery cell 30. The flexible substrate 24, the control circuitry 26, and the OLED-photodiode pairs 28 are able to conform to the surface of the battery cell. Because the OLED-photodiode pairs 28 are arranged along the flexible substrate 24 in a direction that is to be rolled about the circumference of the battery cell 30, the OLED-photodiode pairs 28 once applied to the battery cell 30 are each arranged to point in a different direction. In particular, OLED-photodiode pair 28(D) points in a first direction, OLED-photodiode pair 28(E) points in a second direction, and OLED-photodiode pair 28(F) points in a third direction. In this way each of the OLED-photodiode pairs 28 can be used, when applied to the battery cell 30, to communicate in a different direction under the control of the control circuitry 26.

Figure 2B:
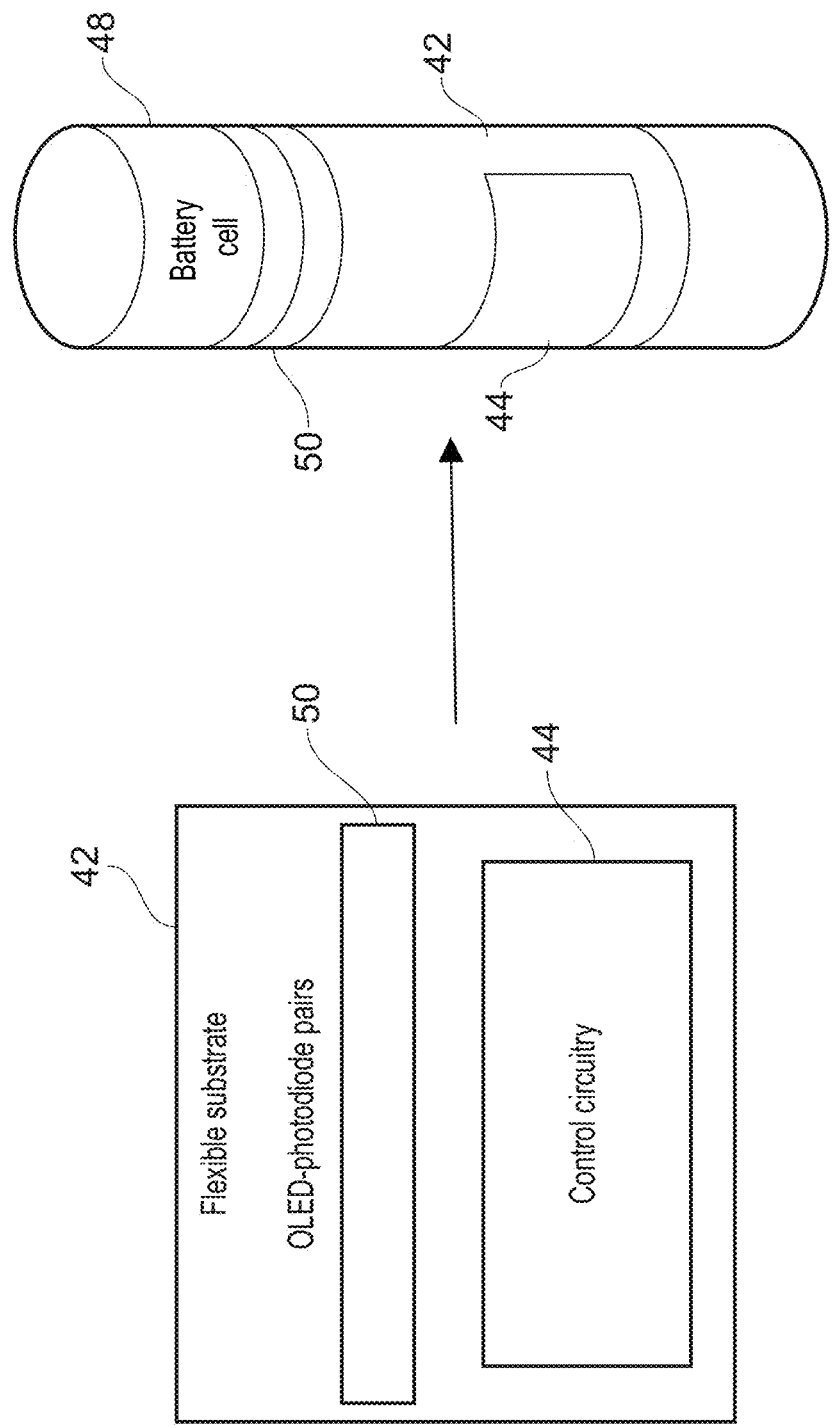
FIG. 2b schematically illustrates a battery cell monitoring system comprising a continuous OLED-photodiode pair integrated onto a flexible substrate according to various configurations of the present techniques.

FIG. 2b schematically illustrates a battery cell monitoring system in which the control circuitry 44 is integrated onto a flexible substrate 42. In addition, the flexible substrate is provided with a single flexible OLED-photodiode pair 50 integrated thereon. In the illustrated example, the OLED-photodiode pair 50 forms at least part of the wireless communication circuitry with which the battery cell monitoring system 42 is able to communicate with the one or more other battery cell monitoring systems. Because the OLED-photodiode pair 50 and the control circuitry 44 are integrated onto the flexible substrate 42, both the control circuitry 44 and the OLED-photodiode pair 50 can be applied to the surface of a battery cell 48. The right hand side of FIG. 2b schematically illustrates the flexible substrate 42 applied to the battery cell 48. The flexible substrate 42, the control circuitry 44, and the OLED-photodiode pair 50 are able to conform to the surface of the battery cell. Because the OLED-photodiode pair 50 is arranged along the flexible substrate 42 in a direction that is to be rolled about the circumference of the battery cell 48, the OLED-photodiode pair 50 once applied to the battery cell 48 is arranged to point in all directions around the battery cell 48. In this way the OLED-photodiode pair 50 can be used, when applied to the battery cell 48, to communicate in all directions at once under the control of the control circuitry 44.

FIG. 3 schematically illustrates a format of a local communication and a non-local communication according to various configurations of the present techniques. The battery cell monitoring system is arranged to communicate using local and non-local communications. The local and non-local communications are distinguished through the incorporation of information into the communication signals. In the illustrated configuration the local communication is distinguished through the absence of identification information. In particular, the local communication contains only message content 54. In contrast, the non-local communication comprises a cell ID 58 of the battery cell monitoring system from which the message originated in addition to message content 56. The cell ID 58 may be incorporated into the non-local communication as a most significant portion of the bit content of the message. In alternative configurations, the cell ID could be incorporated at any known position within the non-local communication.

Figure 4:
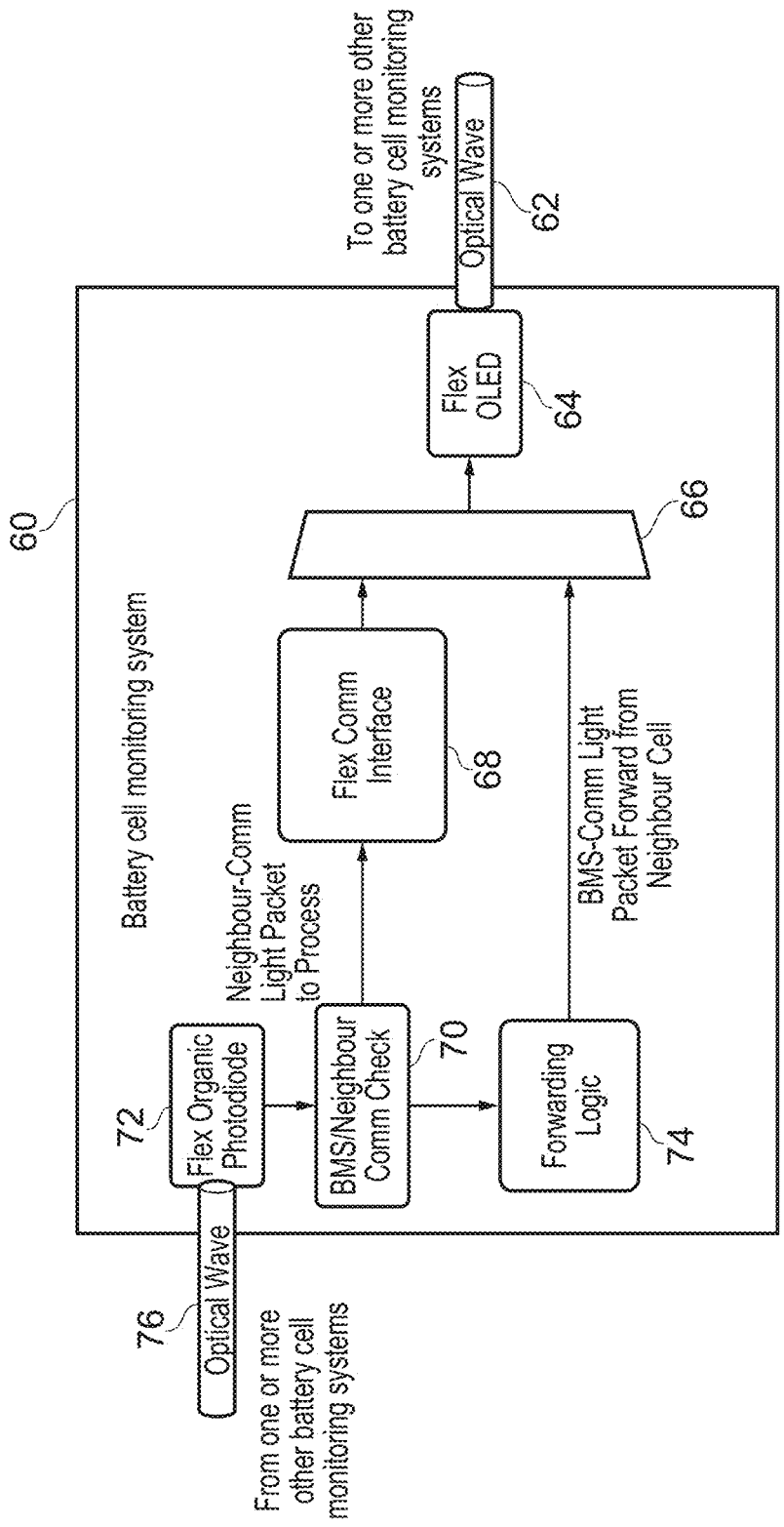
FIG. 4 schematically illustrates components provided in a battery cell monitoring system according to various configurations of the present techniques.

FIG. 4 schematically illustrates details of a battery cell monitoring system 60 according to various configurations of the present techniques. The battery cell monitoring system 60 is provided with a flexible organic photodiode 72 to receive an optical wave 76 from one or more other battery cell monitoring systems and a flexible OLED 64 to transmit an optical wave 62 to the one or more other battery cell monitoring systems. Together the flexible organic photodiode 72 and flexible OLED 64 provide communication circuitry with which the battery cell monitoring system 60 is able to communicate with one or more other battery cell monitoring systems. The battery cell monitoring system 60 is also provided with checking circuitry 70 to determine whether a received signal, encoded in optical wave 76, is a local communication destined for neighbours of the other battery cell monitoring system from which the signal originated or whether the received signal, encoded in optical wave 76, is a non-local communication destined for a battery management system. When the checking circuitry 70 determines that the received wave contains a local communication, the checking circuitry 70 forwards the message to the flexible communication interface 68 which processes the received signal and determines a suitable response, for example, based on a current status of the battery cell monitoring system 60. The flexible communication interface 68 then forwards a response, via switch 66 to the flexible OLED 64 which transmits optical wave 62 as a response to the local communication. When the checking circuit 70 determines that the received wave contains a non-local communication, the checking circuitry 70 forwards the message to forwarding logic 74. Forwarding logic 74 passes the signal, via switch 66, to the flexible OLED 64 which forwards the non-local communication as an optical wave 62 that encodes information indicative of the battery cell monitoring system from which the signal originated.

Figure 5:
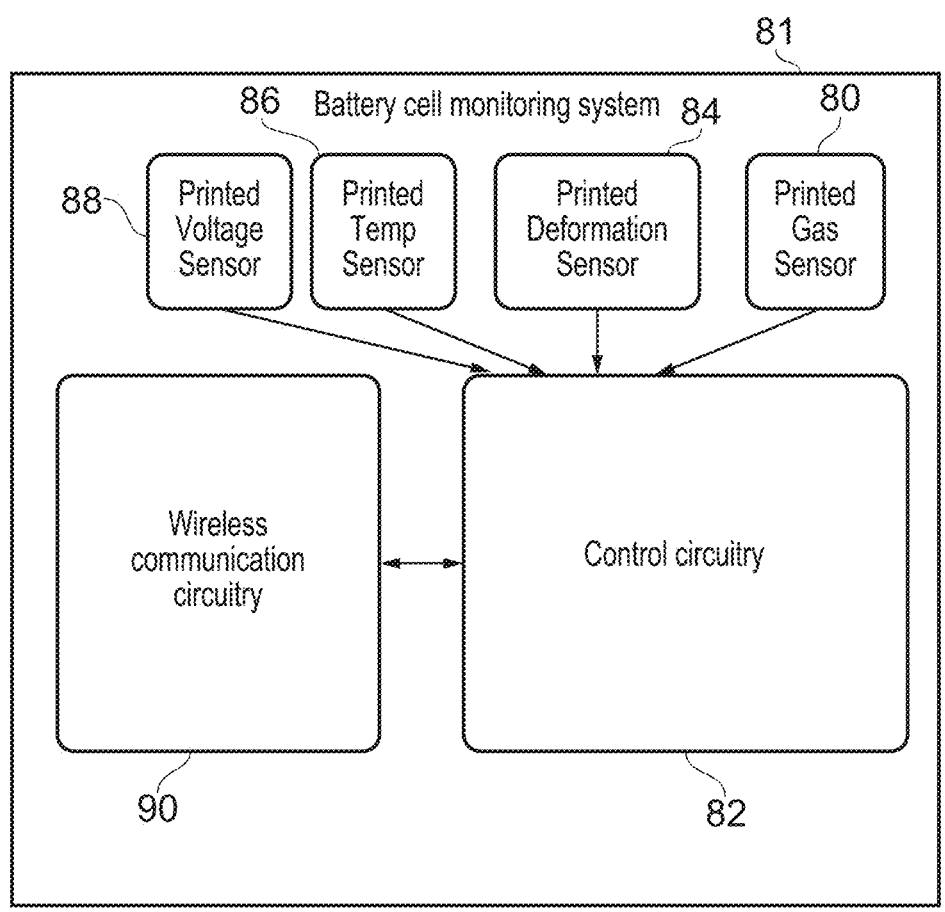
FIG. 5 schematically illustrates components provided in a battery cell monitoring system according to various configurations of the present techniques.

FIG. 5 schematically illustrates a battery cell monitoring system 81 according to various configurations of the present techniques. The battery cell monitoring system 81 is provided with wireless communication circuitry 90 and control circuitry 82. The control circuitry is arranged to communicate with a plurality of different sensors, each of which is arranged to measure one or more properties of a battery cell to which the battery cell monitoring system 81 is attached, or an environment in which the battery cell monitoring system 81 is placed. The battery cell monitoring system 81 is provided in this example with a printed voltage sensor 88 to measure a voltage output by a battery cell to which the battery cell monitoring system 81 is attached. The battery cell monitoring system 81 is also provided with a printed temperature sensor 86 to measure a temperature of the battery cell to which the battery cell monitoring system is attached and/or a temperature of an environment in which the battery cell monitoring system 81 is place. The battery cell monitoring system 81 is also provided with a printed deformation sensor 84 to measure a deformation of a battery cell to which the battery cell monitoring system 81 is attached. The battery cell monitoring system 81 is also provided with a printed gas sensor 80 configured to measure a concentration of gas in a vicinity of the battery cell monitoring system 81. The printed sensors including the printed voltage sensor 88, the printed temperature sensor 86, the printed deformation sensor 84 and the printed gas sensor 80 are arranged to provide information to the control circuitry 82 which processes the information to determine a status of the battery cell to which the battery cell monitoring system is attached and/or an environment in which the battery cell monitoring system is placed. The control circuitry 82 then controls the reporting of the status using the wireless communication circuitry 90 either as a non-local communication, or as a local communication in response to a request received from another battery cell monitoring system or in response to the status meeting a given condition.

Figure 6:
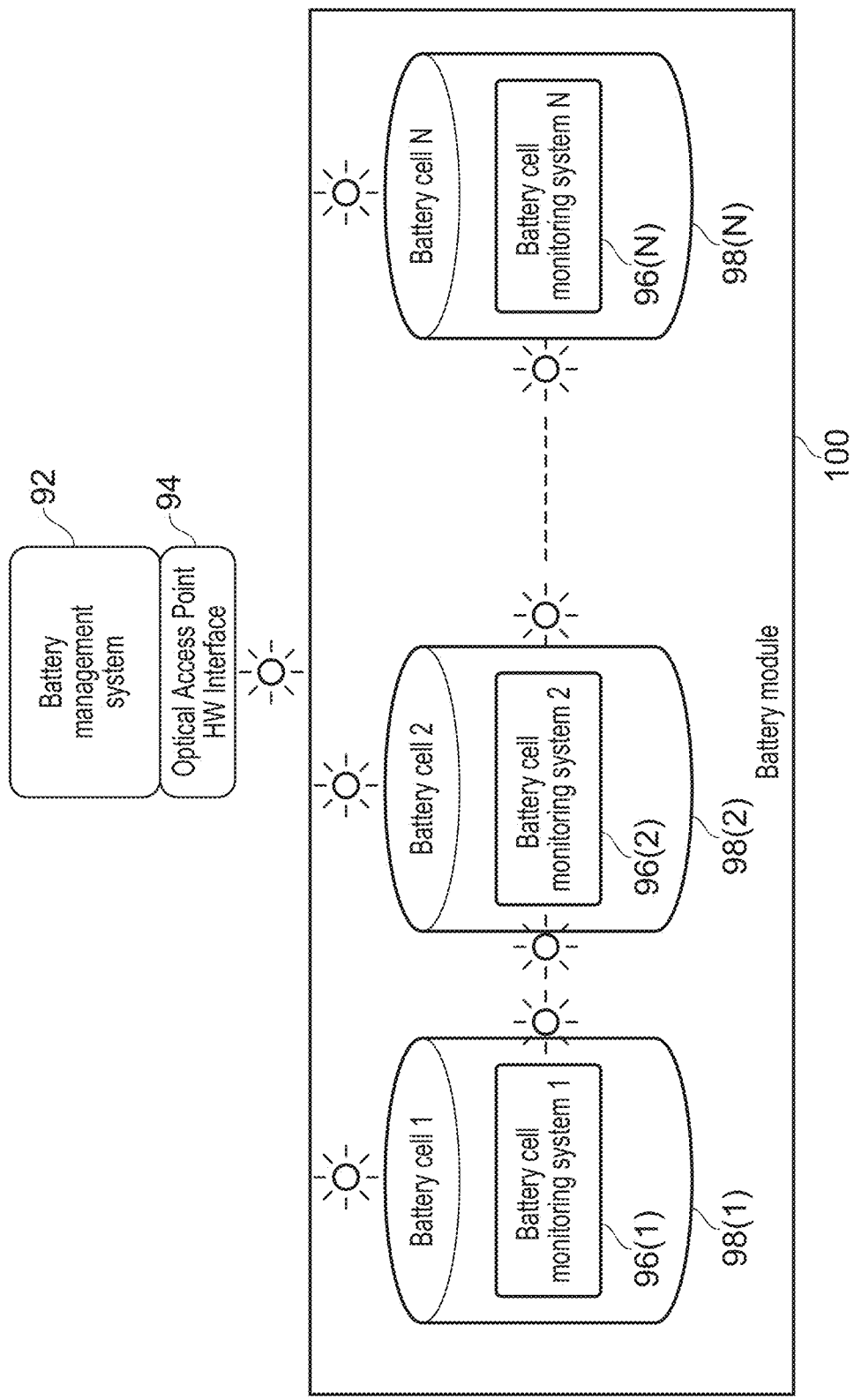
FIG. 6 schematically illustrates a battery management system in communication with a plurality of battery cell monitoring systems according to various configurations of the present techniques.

FIG. 6 schematically illustrates a battery management system 92 in communication with a plurality of battery cell monitoring systems 96 according to various configurations of the present techniques. The battery management system 92 is provided with an optical access point 94 which is coupled to an optical guide 100. The optical guide 100 carries optical signals that are transmitted by the optical access point 94 of the battery management system 92 to each of the plurality of battery cells 96 and from the battery cell monitoring systems to the optical access point 94 of the battery management system 92. Each battery cell monitoring system 96 is applied to a surface of a battery cell 98 and is able to communicate with the battery cell monitoring systems of one or more other battery cells via local communication and with the battery management system via non-local communication. The optical guide 100 acts to distribute signals from the battery management system 92 to a plurality of the battery cells 96. In the illustrated configuration each of battery cell 1 98(1), battery cell 2 98(2) and battery cell N 98(N) are coupled to the battery management system by the optical guide. In addition, each of battery cell 1 98(1), battery cell 2 98(2) and battery cell N 98(N) are coupled to a number of nearest neighbour cells. In particular, battery cell monitoring system 1 96(1) is able to communicate, via local communication, with battery cell monitoring system 96(2). Battery cell monitoring system 2 96(2) is able to communicate, via local communication, with battery cell monitoring system 1 96(1) and battery cell monitoring system 3 (not shown). Non-local communications can be made between the battery cell monitoring systems 96 and the battery management system 92 via one or more other battery cell monitoring systems 96. For example, battery cell monitoring system 2 96(2) can communicate, using non-local communications with the battery management system 92 via the battery cell monitoring system 1 96(1). This is achieved by transmitting a non-local communication from battery cell monitoring system 2 96(2). The transmission is received by battery cell monitoring system 1 96(1) and is retransmitted from battery cell monitoring system 1 96(1) to the optical guide 100 which guides the communication to the optical access point 94 of the battery management system 92. The battery cell monitoring systems 96 are also each able to perform an additional type of non-local communication system which is facilitated by the positioning of the battery cell monitoring systems 96 adjacent to the optical guide 100. Using this further mode of communication, the battery cell monitoring systems 96 in the illustrated embodiment can each communicate with the battery management system without the need for the inter-cell non-local communication mode.

Figure 7A:
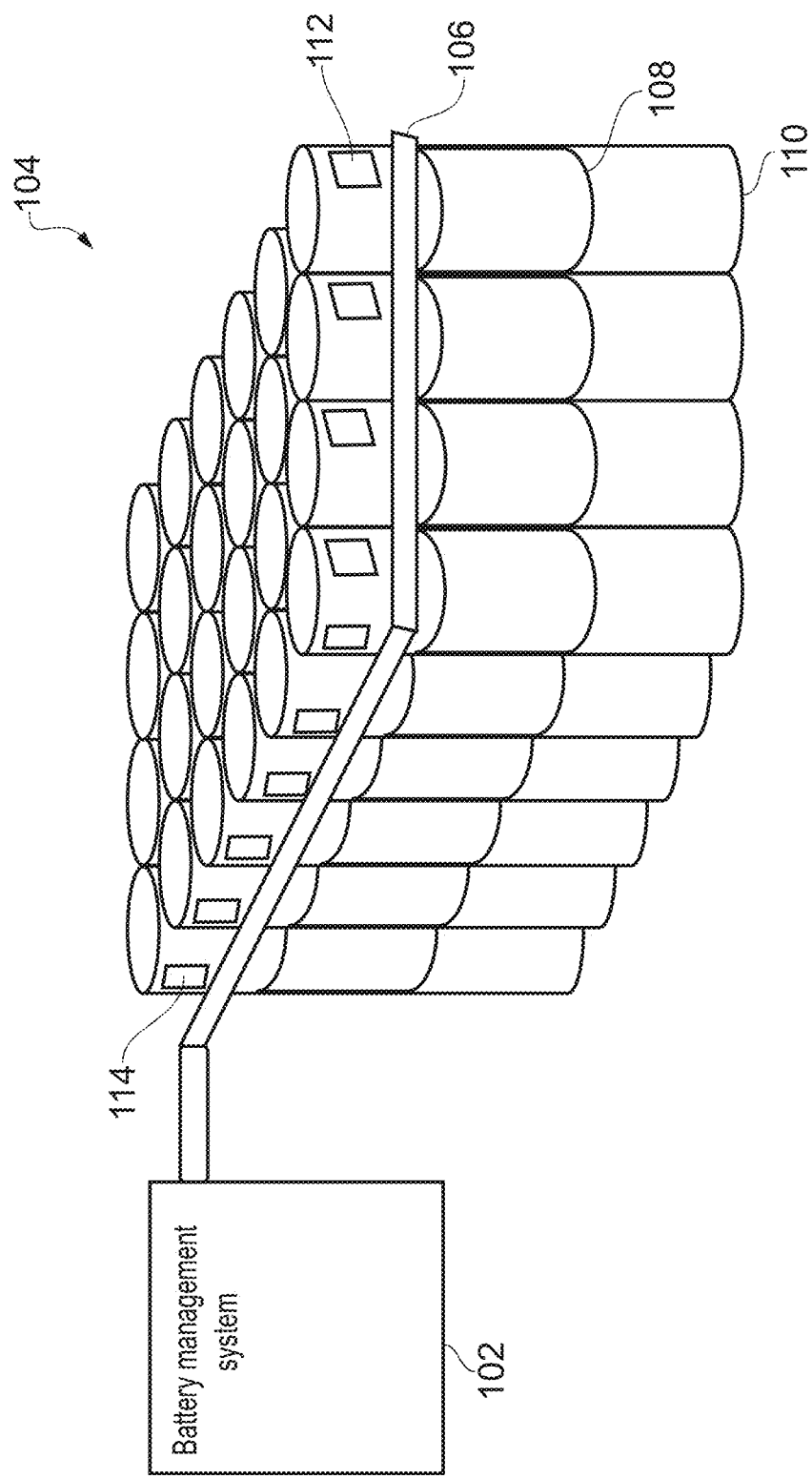
FIG. 7a schematically illustrates a battery management system and a plurality of battery cell monitoring systems according to various configurations of the present techniques.
Figure 7C:
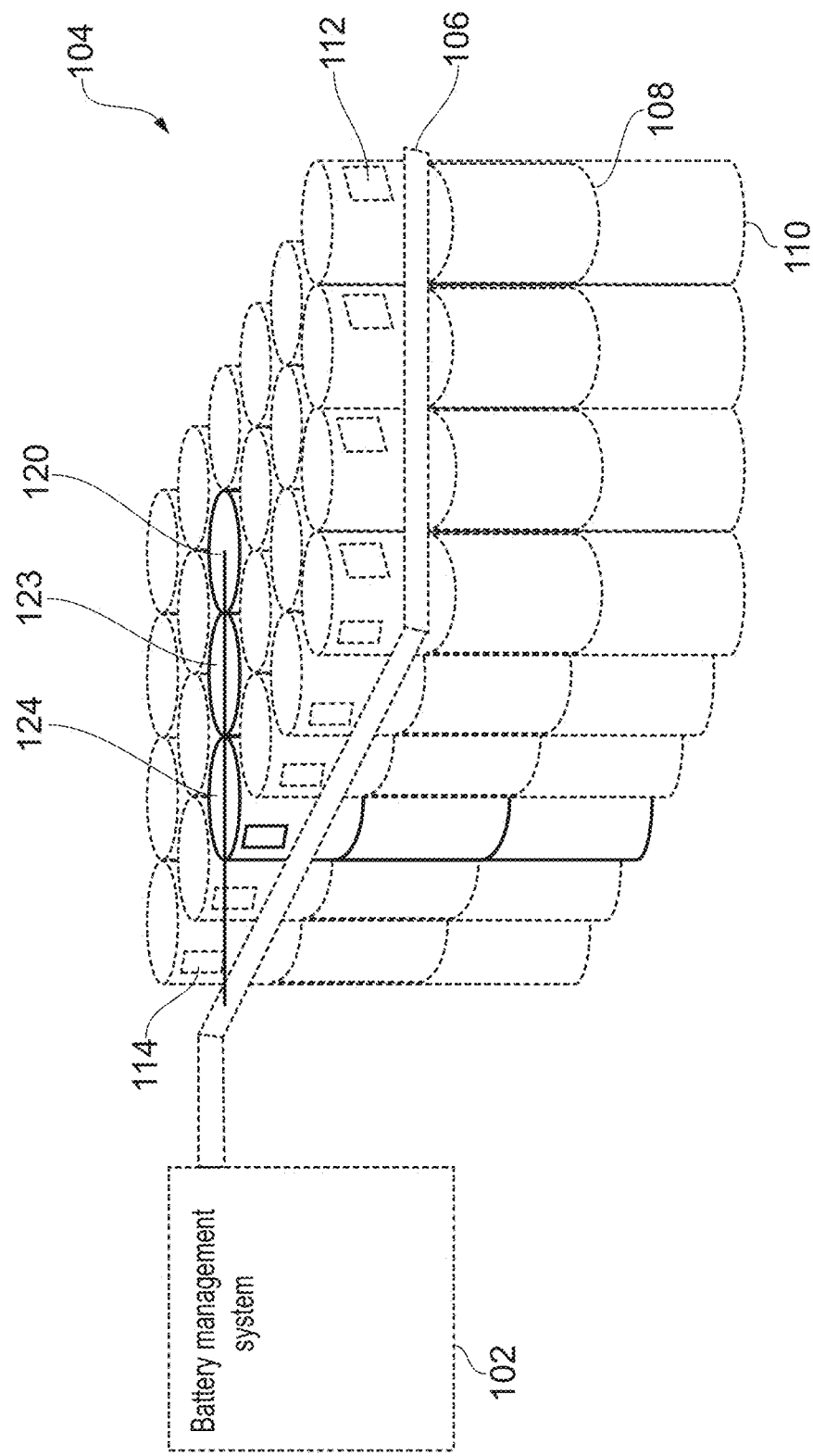
FIG. 7c schematically illustrates a battery management system and a plurality of battery cell monitoring systems according to various configurations of the present techniques.

FIGS. 7a-7c schematically illustrates a battery management system 102 and a plurality of battery cell monitoring systems 108 according to various configurations of the present techniques. The battery cell monitoring systems 108 are arranged on the surface of battery cells 110 arranged in a hexagonal packed battery module 104. An optical guide 106 is arranged around the outside of the battery module 104 to guide optical signals between the battery management system 102 and each of the battery cell monitoring systems 108. Unlike the configuration illustrated in FIG. 6, this arrangement does not enable each battery cell monitoring system 108 to be able to communicate directly with the battery management system 102 via a further non-local communication. Rather, battery cell monitoring systems 108 that are not located on the edge of the battery pack are unable to directly communicate with the optical guide 106 and, instead, perform non-local communication with the battery management system 102 via one or more other battery cell monitoring systems 108. Each battery cell monitoring system 108 is provided with wireless communication circuitry in the form of optical communication interfaces 112 and 114 (for ease of illustration these are shown external to the blocks 108 but as discussed earlier are provided as part of each battery cell monitoring system). The optical communication interfaces enable the battery cell monitoring systems to communicate with one another.

FIG. 7b schematically illustrates communication between a particular battery cell monitoring system 120 and its nearest neighbours 122. The particular battery cell monitoring system 120 is configured to perform local communication with each of its nearest neighbours 122. In particular, when performing a local communication, the particular battery cell monitoring system 120 uses the optical communication interfaces 112 and 114 to transmit an optical signal that is received by battery cell monitoring systems 122(A), 122(B), 122(C), 122(D), 122(E), and 122(F). Because there are no other battery cell monitoring systems that have a direct line of sight of the particular battery cell monitoring system 120 and because the battery cells themselves are optically opaque, it is only the battery cell monitoring systems 122, which are immediately adjacent to the particular battery cell monitoring system 120, that receive the optical signal. Hence, the local communications issued by the particular battery cell monitoring system 120 are restricted to communications between nearest neighbours. The particular battery cell monitoring system 120 is not connected (has no line of sight optical communication path) to the optical guide 106 and therefore cannot communicate with the battery management system 102 without transmitting the signal via one or more other battery cell monitoring systems 122. Hence, the particular battery cell monitoring system 120 is only able to communicate with the battery management system 102 by issuing a non-local communication that is transmitted via the other battery cell monitoring systems 122 that are adjacent to the particular battery cell monitoring system. Hence, on receipt of a non-local communication from the particular battery cell monitoring system 120, each of the other battery cell monitoring systems 122 is configured to retransmit the signal as a non-local communication which, in turn, is passed to the nearest neighbours of those battery cell monitoring systems and on to the optical guide 106 and to the battery management system 102. In this way the non-local communications are each transmitted through all possible optical paths to the battery management system 102.

FIG. 7c schematically illustrates an alternative method by which a non-local communication can be transmitted from the particular battery cell monitoring system 120 to the battery management system 102. In this illustrated configuration, the particular battery cell monitoring system 120 knows its position within the battery module 104 and determines a path for transmission of the non-local communication through the battery module to the optical guide 106. In the illustrated configuration, the particular battery cell monitoring system transmits the non-local communication, including information identifying the particular battery cell monitoring system 120 as the origin of the non-local communication, to a first intermediate battery cell monitoring system 123 that is one of the battery cell monitoring systems that is adjacent to the particular battery cell monitoring system 120. The first intermediate battery cell monitoring system determines, from the information that is included in the non-local communication that the signal is a non-local communication identifying the particular battery cell monitoring system 120 as the origin of the non-local communication. The first intermediate battery cell monitoring system 123 uses this information, in combination with knowledge of its position in the battery cell module, to determine a route for the non-local communication to the optical guide 106. In the illustrated configuration the first intermediate battery cell monitoring system 123 transmits the non-local communication identifying the particular battery cell monitoring system 120 as the origin of the communication to a second intermediate battery cell monitoring system 124. The second intermediate battery cell monitoring system 124 determines, from the information that is included in the non-local communication that the signal is a non-local communication identifying the particular battery cell monitoring system 120 as the origin of the non-local communication. The second intermediate battery cell monitoring system uses this information, in combination with knowledge of its position in the battery cell module to determine a route for the non-local communication to the optical guide 106. In the illustrated configuration the second intermediate battery cell monitoring system 124 transmits the non-local communication identifying the particular battery cell monitoring system 120 as the origin of the communication to the optical guide 106 which guides the signal to the battery management system 102.

Figure 8:
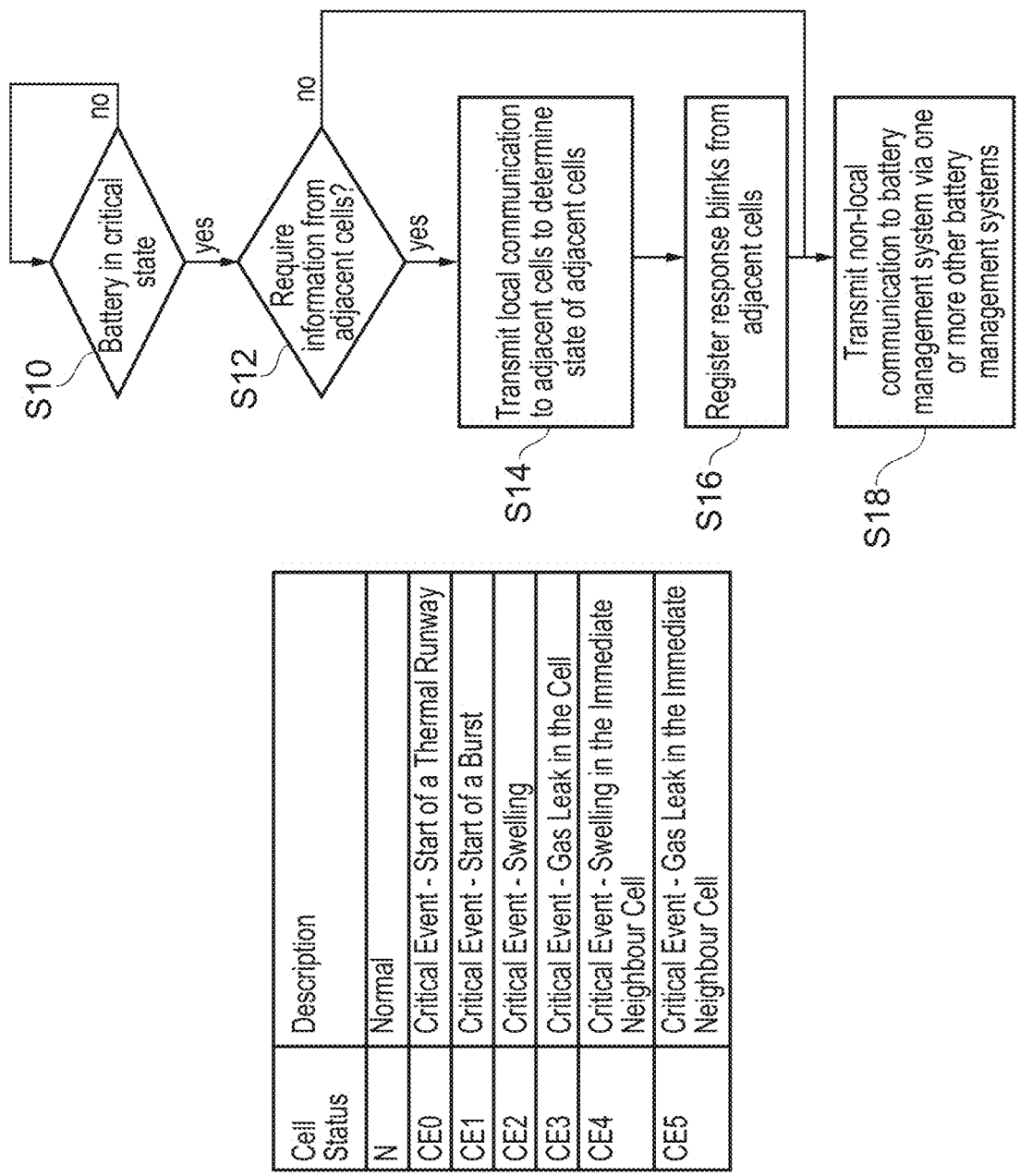
FIG. 8 schematically illustrates a sequence of steps carried out by a battery cell monitoring system according to various configurations of the present techniques.

FIG. 8 schematically illustrates a sequence of steps that are carried out by the battery cell monitoring system. Flow begins at step S10 where it is determined if the battery is in a critical state. This determination is made if one or more signals from a sensor that determines a current status of a battery cell or its immediate environment indicates that a particular condition has been met. If not then flow remains at step S10. If it is determined that the battery is in a critical state then flow proceeds to step S12 where it is determined, based on the state of the battery, whether information from adjacent cells is required. If, at step S12, it is determined that no information is required from adjacent cells then flow proceeds to step S18. If however, at step S12 it is determined that information is required from adjacent cells then flow proceeds to step S14 where the battery cell monitoring system transmits a local communication to one or more other battery cell monitoring systems that are attached to adjacent cells. The information that is transmitted as part of the local communication comprises information indicative of a type of response required from the one or more other battery cell monitoring systems. Flow then proceeds to step S16 where the battery cell monitoring system registers response blink from adjacent cells. Flow then proceeds to step S18 where the battery cell monitoring system performs a non-local communication to the battery management system (via inter-cell communication) indicating that the battery is in a critical state and, where relevant, providing information indicative of a state of the one or more adjacent other battery cell monitoring systems.

For example, and as illustrated in FIG. 8, when the state of the battery indicates that there is swelling or indicates that there is a gas leak, the battery cell monitoring system transmits a local communication to the immediate neighbour cells to obtain information indicative of whether any of the immediate neighbour cells are observing a swelling or a gas leak. Based on the responses from those immediate neighbour cells, the battery cell monitoring system can then determine whether to categorise the critical event as either a local swelling (cell status CE2), a swelling in an immediate neighbour cell (cell status CE4), a gas leak in the cell (cell status CE3) or a gas leak in an immediate neighbour cell (cell status CE5), and can then transmit a non-local communication to the battery management system to advise of the determined status. In this way, the battery management system is able to build up an overview as to which battery cells that are managed by the battery management system are in a critical state and which are not.

Figure 9:
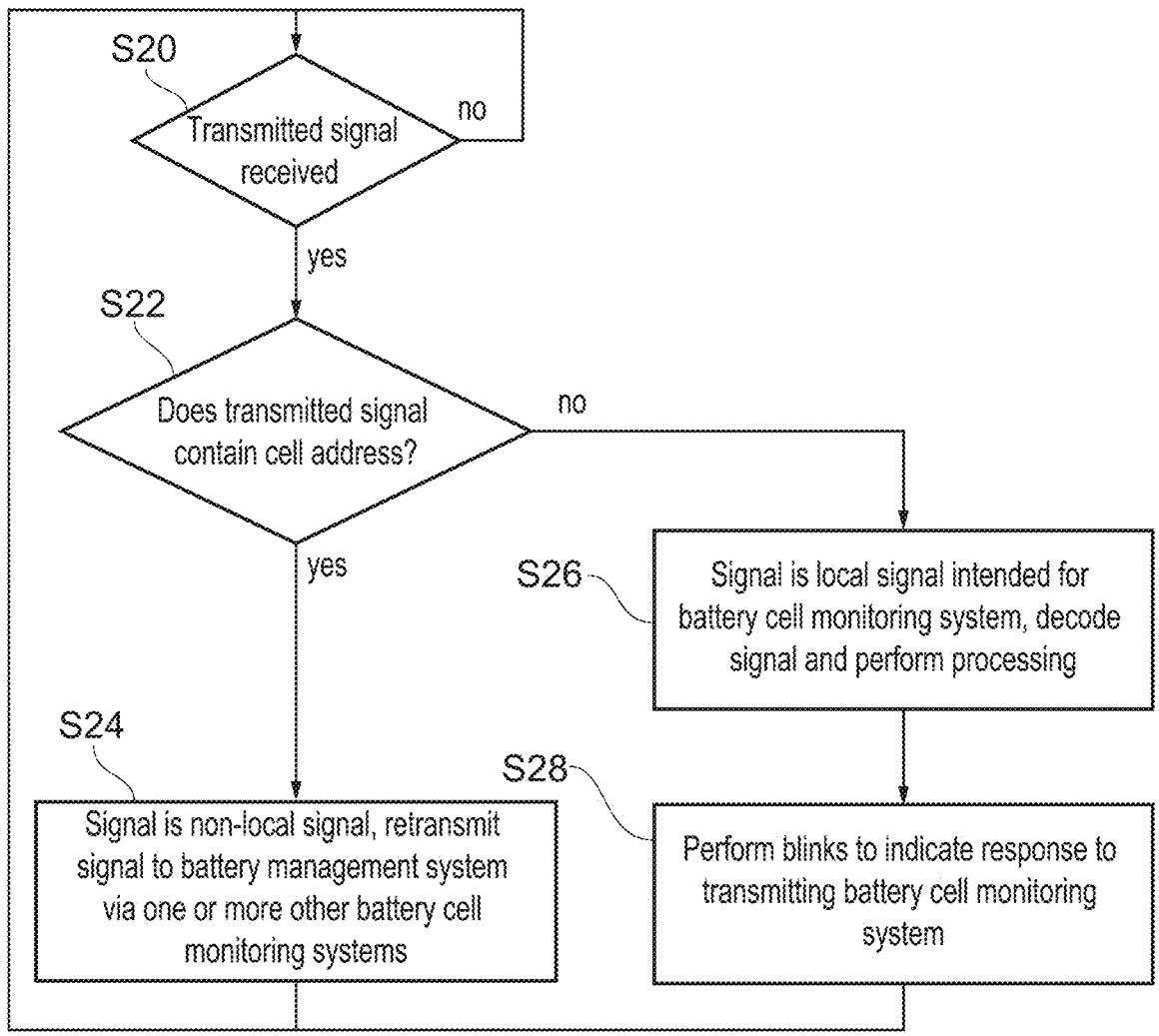
FIG. 9 schematically illustrates a sequence of steps carried out by a battery cell monitoring system according to various configurations of the present techniques.

FIG. 9 schematically illustrates a sequence of steps that are carried out by a battery cell monitoring system in response to receiving a transmitted signal. Flow begins at step S20 where it is determined if a transmitted signal is received. If a transmitted signal has not been received, then flow remains at step S20. If, on the other hand, it is determined that a transmitted signal has been received, flow proceeds to step S22 where it is determined if the transmitted signal contains a cell address. If the transmitted signal contains a cell address then flow proceeds to step S24 where it is determined that the signal is a non-local signal and the non-local signal is retransmitted to the battery management system via one or more other battery cell monitoring systems. Flow then returns to step S20. If, at step S22, it was determined that the transmitted signal does not contain a cell address then flow proceeds to step S26 where it is determined that the signal is a local signal that is intended for the battery cell monitoring system. The signal is decoded and processing is performed to determine an appropriate response to the local transmission based on a state of the local system. Flow then proceeds to step S28 where the battery cell monitoring system performs a sequence of blinks to indicate a response to the transmitting battery cell monitoring system. Flow then returns to step S20.

Figure 10:
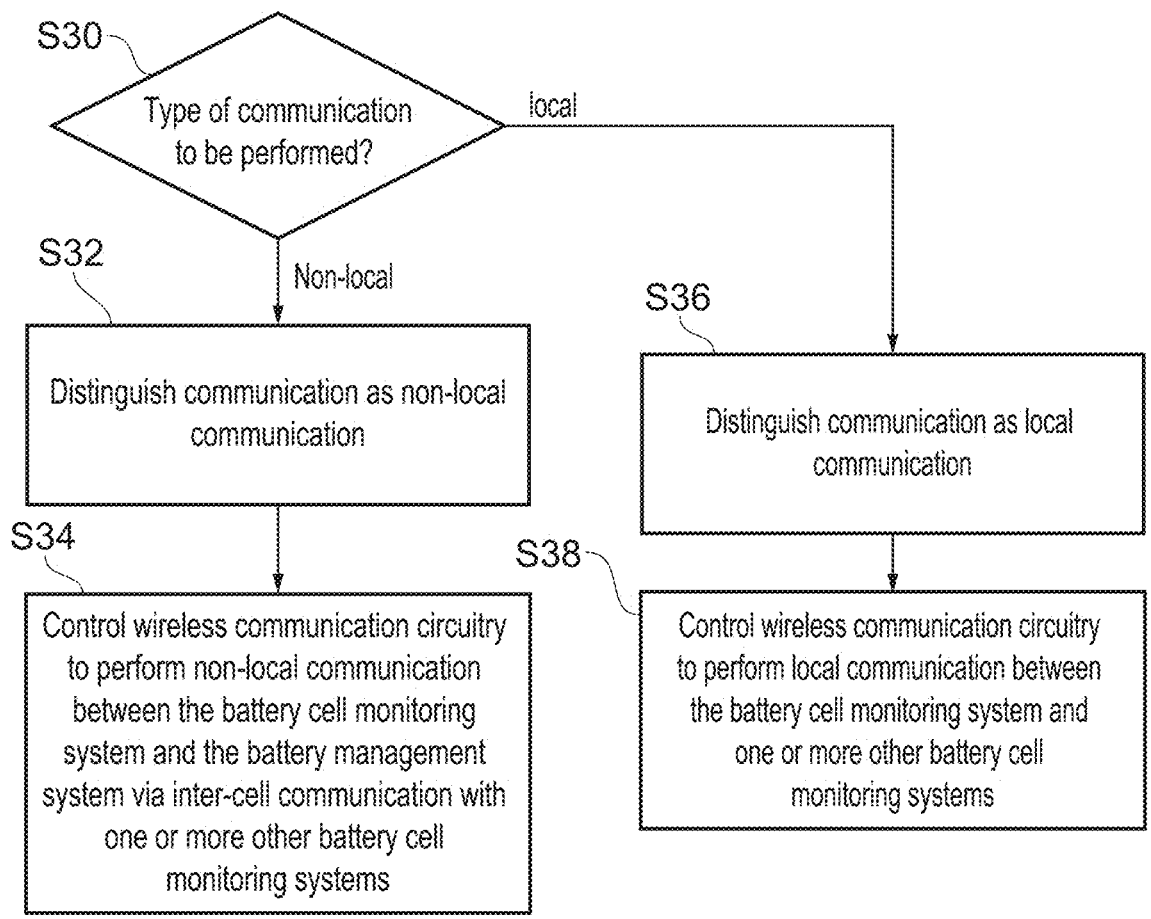
FIG. 10 schematically illustrates a sequence of steps carried out by a battery cell monitoring system according to various configurations of the present techniques.

FIG. 10 schematically illustrates a sequence of steps carried out by a battery cell monitoring system according to various configurations of the present techniques. Flow begins at step S30 where the battery cell monitoring system determines what type of communication is being performed. If it is determined that a non-local communication should be performed then flow proceeds to step S32 where information is included in the communication to distinguish the communication as a non-local communication. Flow then proceeds to step S34 where the battery cell monitoring system controls the wireless communication circuitry to perform a non-local communication between the battery cell monitoring system and the battery management system via inter-cell communication with one or more other battery cell monitoring systems. Alternatively, if at step S30 it was determined that the type of communication to be performed is a local communication, then flow proceeds to step S36 where the communication is distinguished as a local communication. Flow then proceeds to step S38 where the battery cell monitoring system controls the wireless communication circuitry to perform a local communication between the battery cell monitoring system and one or more other battery cell monitoring systems.

Figure 11:
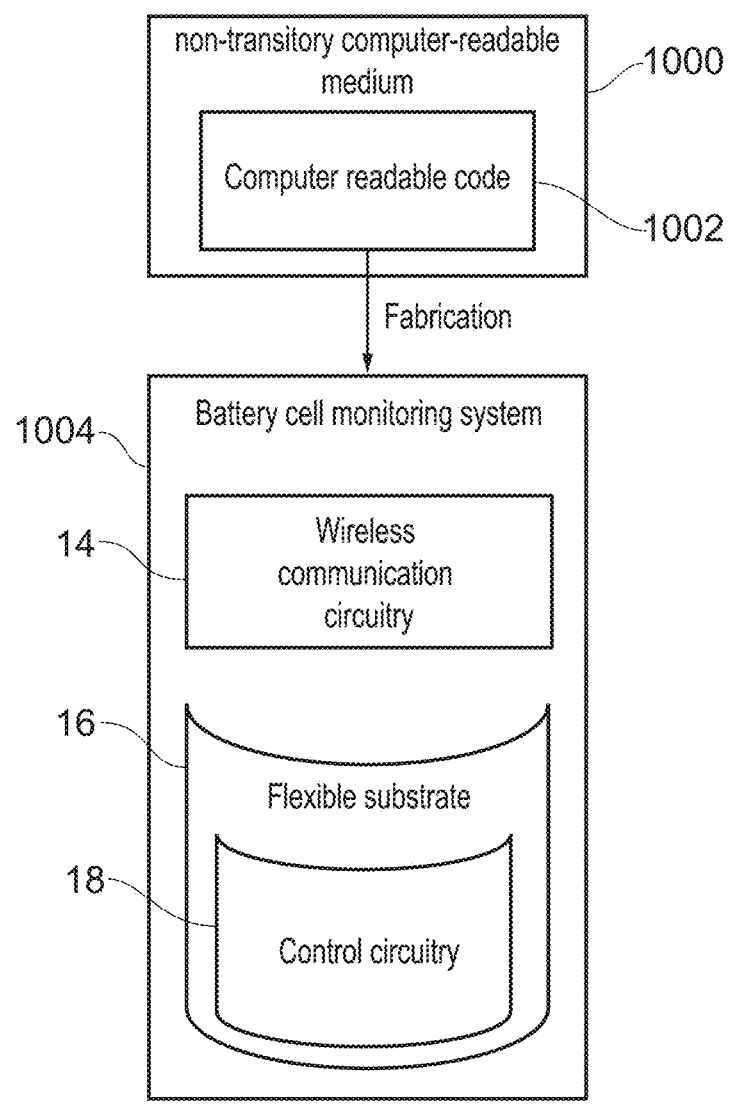
FIG. 11 schematically illustrates the fabrication of a battery cell monitoring system according to various configurations of the present techniques.

FIG. 11 schematically illustrates the fabrication of a battery cell monitoring system according to various configurations of the present techniques. Fabrication may be carried out based on computer readable code 1002 that is stored on a non-transitory computer-readable medium 1000. The computer-readable code can be used at one or more stages of a semiconductor design and fabrication process, including an electronic design automation (EDA) stage, to fabricate an integrated circuit comprising the apparatus embodying the concepts. The fabrication process involves the application of the computer readable code 1002 either directly into one or more programmable hardware units such as a field programmable gate array (FPGA) to configure the FPGA to embody the configurations described hereinabove or to facilitate the fabrication of an apparatus implemented as one or more integrated circuits or otherwise that embody the configurations described hereinabove. The fabricated design 1004 comprises the wireless communication circuitry 14, and the control circuitry 18 integrated onto a flexible substrate 16 as described in reference to FIG. 1.

In brief overall summary there is provided a battery cell monitoring system comprising a flexible substrate able to conform to a surface of a battery cell to be monitored and wireless communication circuitry to be positioned proximate to a surface of the battery cell and arranged to communicate with one or more other battery cell monitoring systems. The battery cell monitoring system is provided with control circuitry integrated onto the flexible substrate to control the wireless communication circuitry to perform two types of communication. The first of the two types of communication is a local communication between the battery cell monitoring system and each of the one or more other battery cell monitoring systems. The second of the two types of communication is a non-local communication between the battery cell monitoring system and a battery management system routed via inter-cell communication with the one or more other battery cell monitoring systems.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

Other example arrangements are set out in the following clauses:

1. A battery cell monitoring system comprising:
    a flexible substrate able to conform to a surface of a battery cell to be monitored;
    wireless communication circuitry to be positioned proximate to a surface of the battery cell and arranged to communicate with one or more other battery cell monitoring systems;
    control circuitry integrated onto the flexible substrate, wherein the control circuitry is configured to control the wireless communication circuitry to perform two types of communication comprising:
        a local communication between the battery cell monitoring system and each of the one or more other battery cell monitoring systems; and
        a non-local communication between the battery cell monitoring system and a battery management system, wherein the non-local communication is routed via inter-cell communication with the one or more other battery cell monitoring systems,
    wherein the control circuitry is configured to cause information to be incorporated into communication signals issued by the wireless communication circuitry sufficient to distinguish between the local communication and the non-local communication.

2. The battery cell monitoring system of clause 1, wherein the control circuitry is configured to incorporate an identifier into the communication signals forming the non-local communication and to omit the identifier from the communication signals forming the local communication, to thereby distinguish between the local communication and the non-local communication.

3. The battery cell monitoring system of clause 2, wherein the identifier is a cell address of the battery cell indicating that the non-local communication originated from the battery cell monitoring system.

4. The battery cell monitoring system of any preceding clause, wherein the wireless communication circuitry is arranged to receive a transmitted communication from a transmitting battery cell monitoring system of the one or more other battery cell monitoring systems.

5. The battery cell monitoring system of clause 4, wherein the control circuitry is arranged to perform a determination as to whether the transmitted communication is a local transmitted communication requiring a response from the battery cell monitoring system or a non-local transmitted communication intended for the battery management system based on a transmitted identifier encoded in the transmitted communication.

6. The battery cell monitoring system of clause 5, wherein:
    the transmitted identifier is a cell address indicating that the transmitted communication originated from a given battery cell monitoring system amongst the one or more other battery cell monitoring systems;
    the control circuitry is responsive to inclusion of the transmitted identifier to determine that the transmitted communication is the non-local transmitted communication; and
    the control circuitry is responsive to an absence of the transmitted identifier to determine that the transmitted communication is the local transmitted communication.

7. The battery cell monitoring system of clause 5 or clause 6, wherein the control circuitry is arranged, in response to the determination indicating that the transmitted communication is a local transmitted communication, to generate response status information and to control the wireless communication circuitry to transmit the response status information as a local response communication.

8. The battery cell monitoring system of any of clause 5 to clause 7, wherein the control circuitry is arranged, in response to the determination indicating that the transmitted communication is a non-local transmitted communication, to control the wireless communication circuitry to re-transmit the non-local transmitted communication to the battery management system via inter-cell communication with at least one of the one or more other battery cell management systems.

9. The battery cell monitoring system of any preceding clause, further comprising at least one sensor configured to output a signal indicative of a physical state of the battery cell, wherein the control circuitry is configured to generate status information based on the signal, and
    wherein the control circuitry is configured to transmit the local communication to each of the one or more other battery cell monitoring systems in response to the status information meeting a given condition.

10. The battery cell monitoring system of clause 9, wherein:
    the at least one sensor is a gas emission sensor and the given condition is a threshold concentration of gas; and the local communication is a request for information indicative of gas emissions detected by at least one of the one or more other battery cell monitoring systems.

11. The battery cell monitoring system of clause 9, wherein the at least one sensor is a physical deformation sensor and the given condition is a threshold deformation; and the local communication is a request for information indicative of physical deformations detected by at least one of the one or more other battery cell monitoring systems.

12. The battery cell monitoring system of any of clauses 9 to 11, wherein the given condition is a dynamically varying threshold condition.

13. The battery cell monitoring system of any preceding clause, wherein the wireless communication circuitry is an optical communication interface.

14. The battery cell monitoring system of clause 13, wherein the optical communication interface comprises at least one LED-photodiode pair.

15. The battery cell monitoring system of clause 14, wherein the at least one LED-photodiode pair comprises a plurality of LED-photodiode pairs, each LED-photodiode pair to be positioned proximate to the surface of the battery cell and aligned to perform communication in a different direction to each other LED-photodiode pair of the plurality of LED-photodiode pairs.

16. The battery cell monitoring system of clause 14, wherein each of the at least one LED-photodiode pairs is a flexible LED-photodiode pair able to conform to a surface of a battery cell to be monitored.

17. The battery cell monitoring system of clause 16, w % herein the at least one LED-photodiode pair is a single LED-photodiode pair wrapped around the surface of the battery cell to be monitored.

18. The battery cell monitoring system of any of clause 13 to clause 17, wherein the control circuitry is configured to control the optical communication interface to perform communication by performing one or more blinks of an optical element of the optical communication interface, in accordance with a given blinking protocol.

19. The battery cell monitoring system of clause 18, wherein:
the control circuitry is configured to control the optical communication interface to perform local communication by performing the one or more blinks to request information from each of the one or more other battery cell monitoring systems; and
the control circuitry is configured to determine a state associated with each of the one or more other battery cell monitoring systems based on a number of blinks received from the one or more other battery cell monitoring systems.

20. The battery cell monitoring system of any preceding clause, wherein:
the battery cell is configured to be arranged in a battery module with a plurality of adjacent battery cells, each comprising one of the one or more battery cell monitoring systems; and
the wireless communication circuitry is configured to communicate with the one or more battery cell monitoring systems that are adjacent to the wireless communication circuitry.

21. The battery cell monitoring system of any preceding clause, wherein the wireless communication circuitry is integrated into the flexible substrate.

22. The battery cell monitoring system of any preceding clause, wherein the wireless communication circuitry is arranged as an omni-directional communication device.

23. The battery cell monitoring system of any preceding clause, wherein the control circuitry is configured to control the wireless communication circuitry to perform a further non-local communication between the battery cell monitoring system and the battery management system, wherein the further non-local communication is routed directly from the wireless communication circuitry to the battery management system via a communication path independent of the one or more other battery cell management systems.

24. A battery pack comprising:
a plurality of battery modules, wherein each battery module comprises a plurality of battery cells and wherein two or more of the plurality of battery cells comprise the battery cell monitoring system as set out in any preceding clause; and
a battery management system comprising communication circuitry configured to receive each non-local communication transmitted by the wireless communication circuitry of the battery cell monitoring system.

25. The battery pack of clause 24, wherein:
the wireless communication circuitry is an optical communication interface; and
each of the plurality of battery modules is arranged with an optical guide configured to couple the battery management system to the plurality of battery cells of that module.

26. A method of operating a battery cell monitoring system comprising a flexible substrate able to conform to a surface of a battery cell to be monitored and wireless communication circuitry to be positioned proximate to a surface of a battery cell and arranged to communicate with one or more other battery cell monitoring systems, the method comprising:
controlling the wireless communication circuitry, using control circuitry integrated onto the flexible substrate, to perform a local communication between the battery cell monitoring system and each of the one or more other battery cell monitoring systems;
controlling the wireless communication circuitry, using the control circuitry, to perform a non-local communication between the battery cell monitoring system and a battery management system, wherein the non-local communication is routed via inter-cell communication with the one or more other battery cell monitoring systems; and
incorporating information into communication signals issued by the wireless communication circuitry sufficient to distinguish between the local communication and the non-local communication.

27. A non-transitory computer-readable medium to store computer-readable code for fabrication of a battery cell monitoring system comprising:
a flexible substrate able to conform to a surface of a battery cell to be monitored;
wireless communication circuitry to be positioned proximate to a surface of the battery cell and arranged to communicate with one or more other battery cell monitoring systems;
control circuitry integrated onto the flexible substrate, wherein the control circuitry is configured to control the wireless communication circuitry to perform two types of communication comprising:

a local communication between the battery cell monitoring system and each of the one or more other battery cell monitoring systems; and a non-local communication between the battery cell monitoring system and a battery management system, wherein the non-local communication is routed via inter-cell communication with the one or more other battery cell monitoring systems, wherein the control circuitry is configured to cause information to be incorporated into communication signals issued by the wireless communication circuitry sufficient to distinguish between the local communication and the non-local communication.

We claim:

1. A battery cell monitoring system comprising:
a flexible substrate able to conform to a surface of a battery cell to be monitored;
wireless communication circuitry to be positioned proximate to a surface of the battery cell and arranged to communicate with one or more other battery cell monitoring systems;
control circuitry integrated onto the flexible substrate, wherein the control circuitry is configured to control the wireless communication circuitry to perform two types of communication comprising:
  a local communication between the battery cell monitoring system and each of the one or more other battery cell monitoring systems; and
  a non-local communication between the battery cell monitoring system and a battery management system, wherein the non-local communication is routed via inter-cell communication with the one or more other battery cell monitoring systems,
wherein:
the control circuitry is configured to cause information to be incorporated into communication signals issued by the wireless communication circuitry sufficient to distinguish between the local communication and the non-local communication;
the wireless communication circuitry is an optical communication interface comprising at least one LED-photodiode pair; and
the at least one LED-photodiode pair comprises a plurality of LED-photodiode pairs, each LED-photodiode pair to be positioned proximate to the surface of the battery cell and aligned to perform communication in a different direction to each other LED-photodiode pair of the plurality of LED-photodiode pairs.

2. The battery cell monitoring system of claim 1, wherein the control circuitry is configured to incorporate an identifier into the communication signals forming the non-local communication and to omit the identifier from the communication signals forming the local communication, to thereby distinguish between the local communication and the non-local communication.

3. The battery cell monitoring system of claim 2, wherein the identifier is a cell address of the battery cell indicating that the non-local communication originated from the battery cell monitoring system.

4. The battery cell monitoring system of claim 1, wherein the wireless communication circuitry is arranged to receive a transmitted communication from a transmitting battery cell monitoring system of the one or more other battery cell monitoring systems.

5. The battery cell monitoring system of claim 4, wherein the control circuitry is arranged to perform a determination as to whether the transmitted communication is a local transmitted communication requiring a response from the battery cell monitoring system or a non-local transmitted communication intended for the battery management system based on a transmitted identifier encoded in the transmitted communication.

6. The battery cell monitoring system of claim 5, wherein:
the transmitted identifier is a cell address indicating that the transmitted communication originated from a given battery cell monitoring system amongst the one or more other battery cell monitoring systems;
the control circuitry is responsive to inclusion of the transmitted identifier to determine that the transmitted communication is the non-local transmitted communication; and
the control circuitry is responsive to an absence of the transmitted identifier to determine that the transmitted communication is the local transmitted communication.

7. The battery cell monitoring system of claim 5, wherein the control circuitry is arranged, in response to the determination indicating that the transmitted communication is a local transmitted communication, to generate response status information and to control the wireless communication circuitry to transmit the response status information as a local response communication.

8. The battery cell monitoring system of claim 5, wherein the control circuitry is arranged, in response to the determination indicating that the transmitted communication is a non-local transmitted communication, to control the wireless communication circuitry to re-transmit the non-local transmitted communication to the battery management system via inter-cell communication with at least one of the one or more other battery cell management systems.

9. The battery cell monitoring system of claim 1, further comprising at least one sensor configured to output a signal indicative of a physical state of the battery cell, wherein the control circuitry is configured to generate status information based on the signal; and
wherein the control circuitry is configured to transmit the local communication to each of the one or more other battery cell monitoring systems in response to the status information meeting a given condition.

10. The battery cell monitoring system of claim 9, wherein:
the at least one sensor is a gas emission sensor and the given condition is a threshold concentration of gas; and
the local communication is a request for information indicative of gas emissions detected by at least one of the one or more other battery cell monitoring systems.

11. The battery cell monitoring system of claim 9, wherein the at least one sensor is a physical deformation sensor and the given condition is a threshold deformation; and
the local communication is a request for information indicative of physical deformations detected by at least one of the one or more other battery cell monitoring systems.

12. The battery cell monitoring system of claim 9, wherein the given condition is a dynamically varying threshold condition.

13. The battery cell monitoring system of claim 1, wherein each of the at least one LED-photodiode pairs is a flexible LED-photodiode pair able to conform to a surface of a battery cell to be monitored.

14. The battery cell monitoring system of claim 1, wherein the control circuitry is configured to control the optical communication interface to perform communication by performing one or more blinks of an optical element of the optical communication interface, in accordance with a given blinking protocol.

15. The battery cell monitoring system of claim 1, wherein:
  the battery cell is configured to be arranged in a battery module with a plurality of adjacent battery cells, each comprising one of the one or more battery cell monitoring systems; and
  the wireless communication circuitry is configured to communicate with the one or more battery cell monitoring systems that are adjacent to the wireless communication circuitry.

16. The battery cell monitoring system of claim 1, wherein the wireless communication circuitry is integrated into the flexible substrate.

17. A battery pack comprising:
  a plurality of battery modules, wherein each battery module comprises a plurality of battery cells and wherein two or more of the plurality of battery cells comprise the battery cell monitoring system as claimed in claim 1; and
  a battery management system comprising communication circuitry configured to receive each non-local communication transmitted by the wireless communication circuitry of the battery cell monitoring system.

18. The battery pack of claim 17, wherein:
  the wireless communication circuitry is an optical communication interface; and
  each of the plurality of battery modules is arranged with an optical guide configured to couple the battery management system to the plurality of battery cells of that module.

19. A battery cell monitoring system comprising:
  a flexible substrate able to conform to a surface of a battery cell to be monitored;
  wireless communication circuitry to be positioned proximate to a surface of the battery cell and arranged to communicate with one or more other battery cell monitoring systems;
  control circuitry integrated onto the flexible substrate, wherein the control circuitry is configured to control the wireless communication circuitry to perform two types of communication comprising:
    a local communication between the battery cell monitoring system and each of the one or more other battery cell monitoring systems; and
    a non-local communication between the battery cell monitoring system and a battery management system, wherein the non-local communication is routed via inter-cell communication with the one or more other battery cell monitoring systems,
  wherein:
  the control circuitry is configured to cause information to be incorporated into communication signals issued by the wireless communication circuitry sufficient to distinguish between the local communication and the non-local communication;
  the wireless communication circuitry is an optical communication interface;
  the control circuitry is configured to control the optical communication interface to perform communication by performing one or more blinks of an optical element of the optical communication interface, in accordance with a given blinking protocol; and
  the control circuitry is configured to control the optical communication interface to perform local communication by performing the one or more blinks to request information from each of the one or more other battery cell monitoring systems; and
  the control circuitry is configured to determine a state associated with each of the one or more other battery cell monitoring systems based on a number of blinks received from the one or more other battery cell monitoring systems.

20. A battery cell monitoring system comprising:
  a flexible substrate able to conform to a surface of a battery cell to be monitored;
  wireless communication circuitry to be positioned proximate to a surface of the battery cell and arranged to communicate with one or more other battery cell monitoring systems;
  control circuitry integrated onto the flexible substrate, wherein the control circuitry is configured to control the wireless communication circuitry to perform two types of communication comprising:
    a local communication between the battery cell monitoring system and each of the one or more other battery cell monitoring systems; and
    a non-local communication between the battery cell monitoring system and a battery management system, wherein the non-local communication is routed via inter-cell communication with the one or more other battery cell monitoring systems,
  wherein
  the control circuitry is configured to cause information to be incorporated into communication signals issued by the wireless communication circuitry sufficient to distinguish between the local communication and the non-local communication; and
  the control circuitry is configured to control the wireless communication circuitry to perform a further non-local communication between the battery cell monitoring system and the battery management system, wherein the further non-local communication is routed directly from the wireless communication circuitry to the battery management system via a communication path independent of the one or more other battery cell management systems.

* * * * *